United States Patent
Yap et al.

(10) Patent No.: US 6,824,045 B2
(45) Date of Patent: Nov. 30, 2004

(54) METHOD AND SYSTEM FOR USING MULTIPLE SMARTCARDS IN A READER

(75) Inventors: Sue-Ken Yap, Lane Cove (AU); William Simpson-Young, Eastwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 09/835,325

(22) Filed: Apr. 17, 2001

(65) Prior Publication Data

US 2002/0020745 A1 Feb. 21, 2002

(30) Foreign Application Priority Data

Apr. 20, 2000 (AU) .............................................. PQ7056
Sep. 12, 2000 (AU) .............................................. PR0074

(51) Int. Cl.[7] .............................. G06F 17/00; G06K 5/00
(52) U.S. Cl. ........................ 235/375; 235/380; 235/382
(58) Field of Search ................................. 235/442, 451

(56) References Cited

U.S. PATENT DOCUMENTS

| | | | |
|---|---|---|---|
| 4,752,678 A | 6/1988 | Rikuna | 235/380 |
| 4,806,745 A | 2/1989 | Oogita | 235/492 |
| 5,002,062 A | 3/1991 | Suzuki | 128/696 |
| 5,353,016 A | 10/1994 | Kurita et al. | 340/825.22 |
| 5,526,428 A * | 6/1996 | Arnold | 713/159 |
| 5,528,021 A | 6/1996 | Lassus et al. | 235/380 |
| 5,534,857 A | 7/1996 | Laing et al. | 340/5.74 |
| 5,601,489 A | 2/1997 | Komaki | 463/44 |
| 5,949,492 A | 9/1999 | Mankovitz | 348/473 |
| 5,973,475 A | 10/1999 | Combaluzier | 320/107 |
| 6,014,593 A | 1/2000 | Grufman | 700/136 |
| 6,199,752 B1 * | 3/2001 | Bornemann et al. | 235/375 |
| 6,229,694 B1 | 5/2001 | Kono | 361/683 |
| 6,298,441 B1 * | 10/2001 | Handelman et al. | 713/185 |
| 6,405,369 B1 * | 6/2002 | Tsuria | 725/6 |
| 6,418,422 B1 * | 7/2002 | Guenther et al. | 705/401 |
| 6,477,511 B1 * | 11/2002 | Guenther | 705/60 |

FOREIGN PATENT DOCUMENTS

| | | |
|---|---|---|
| AU | 28896/95 | 2/1996 |
| DE | 3637684 | 5/1987 |
| DE | 19757649 | 12/1997 |
| DE | 197576648 | 12/1997 |
| EP | 469581 | 2/1992 |
| EP | 575230 | 6/1993 |
| EP | 668579 | 2/1995 |
| EP | 686947 | 5/1995 |
| EP | 661675 | 7/1995 |
| EP | 829831 | 3/1998 |
| FR | 2752316 | 2/1998 |
| GB | 2 255 934 | 11/1992 |
| GB | 2343091 | 10/1998 |
| JP | 59-123986 | 7/1984 |
| JP | 04-088547 | 3/1992 |
| JP | 03-071329 | 6/2000 |
| WO | WO 95/35534 | 12/1995 |
| WO | 9607267 | 3/1996 |
| WO | 9608798 | 3/1996 |
| WO | 9722092 | 6/1997 |

* cited by examiner

Primary Examiner—Karl D. Frech
Assistant Examiner—April Taylor
(74) Attorney, Agent, or Firm—Fitzpatrick, Cella, Harper & Scinto

(57) ABSTRACT

The method is adapted for using multiple cards with a single reader. The method initiates a session of an application upon an insertion of a first card into the reader. The session is maintained active when the first card is removed from the reader and a second card associated with the first card is to be inserted in the reader. The method performs an action upon an insertion of the second card into the reader.

80 Claims, 11 Drawing Sheets

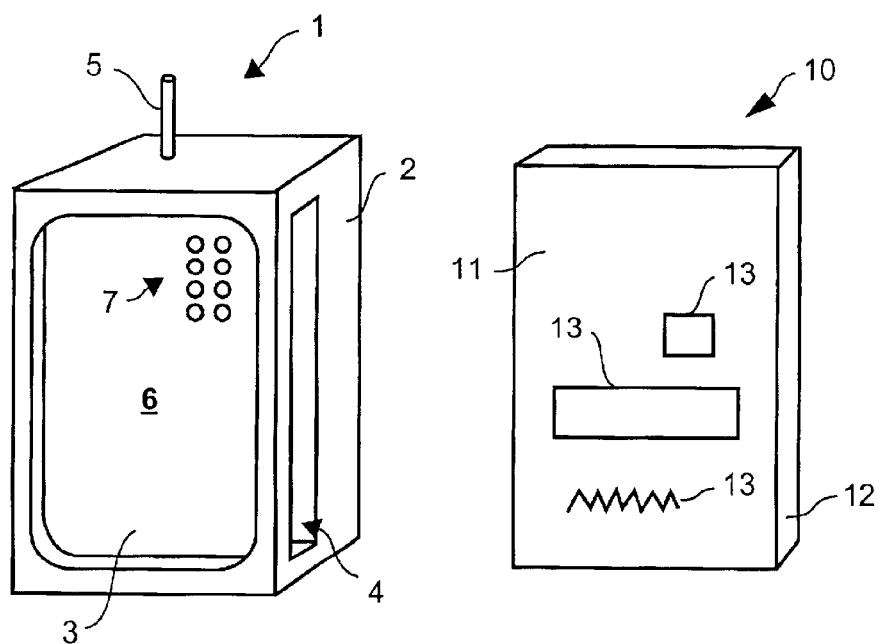
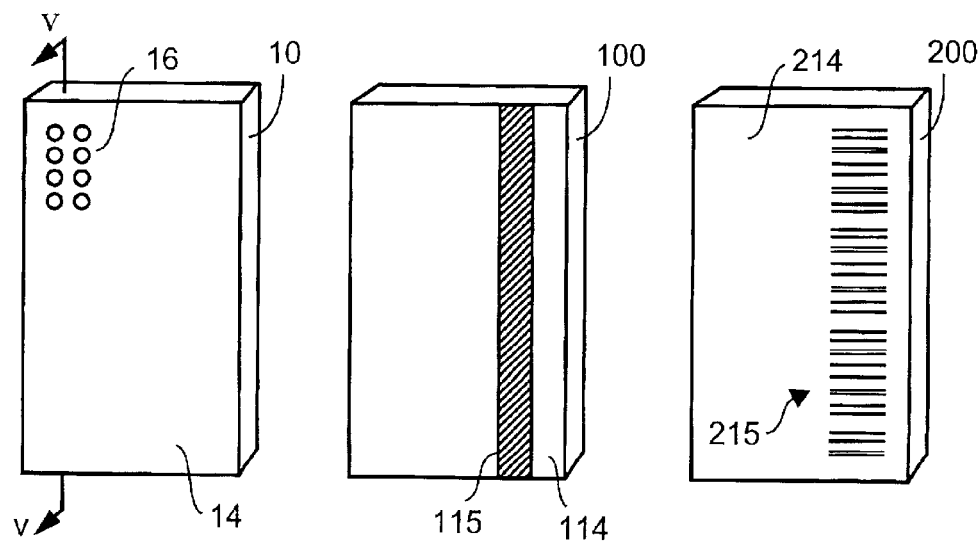
Fig. 1
Fig. 2    Fig. 3    Fig. 4

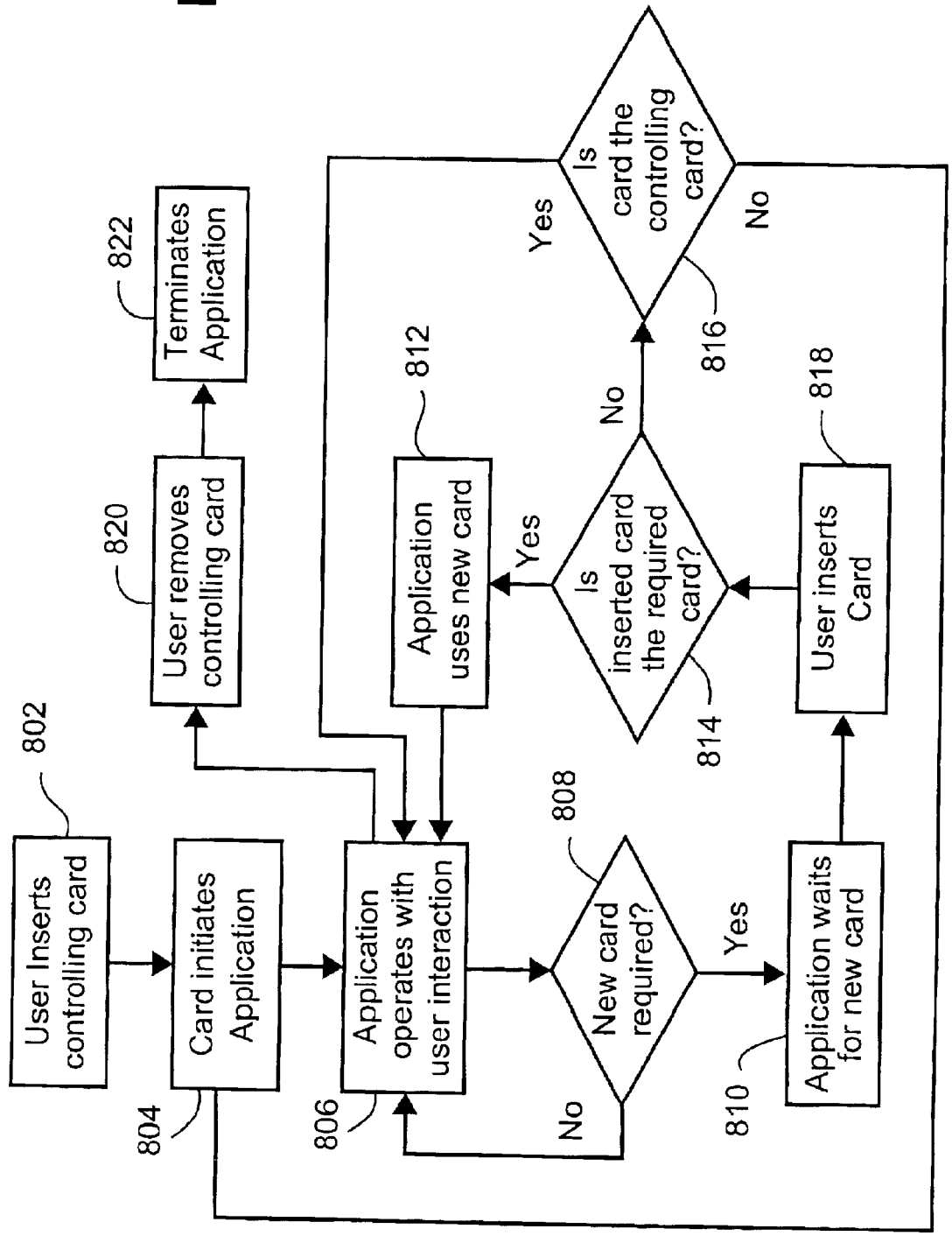

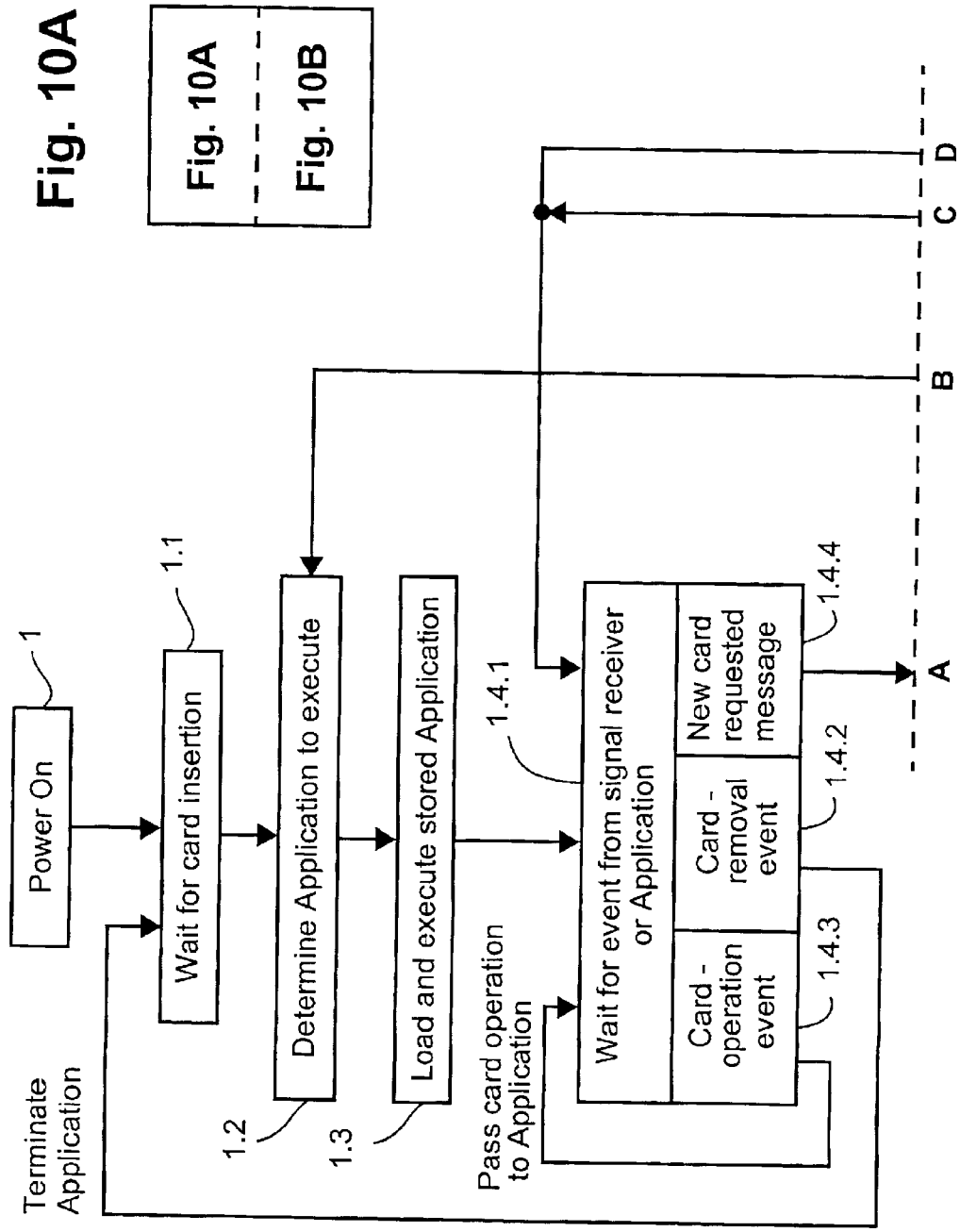

US 6,824,045 B2

METHOD AND SYSTEM FOR USING MULTIPLE SMARTCARDS IN A READER

TECHNICAL FIELD OF THE INVENTION

The present invention relates to a method and system for using multiple smartcards in a smartcard reader. The present invention also relates to a method and apparatus for interfacing between an application and a single smartcard reader. Additionally, the present invention relates to a computer readable medium comprising a computer program for interfacing between an application and a single card reader.

BACKGROUND ART

Smartcards have become increasingly popular in recent years. Smartcards are currently used for various purposes including initiating a new session with a device or application program. In many applications the insertion of a controlling smartcard, or the first use of this smartcard after insertion, is a signal to start a new session. When it involves initiating an application, this may be from the card itself or from the computer system that the smartcard reader is connected to, either directly, or via the network.

While a smartcard is inserted in the reader, a running application may request data that is on another smartcard or require operations to be performed using another smartcard. This is often supported with the provision of a second reader for the data. For example, many handheld units for smartcards or credit cards, which are used at a point-of-sale have a reader in a compartment on the back in which a card associated with the salesperson is placed throughout their shift. During this shift, cards of various customers are placed into a reader on the front of the unit. During each transaction, information is read from both the front reader and the back reader.

Typically, where the reading of two cards is required to perform an operation, it is not usual for the same reader mechanism to be used for both cards. Instead, two readers are often used. In some cases (such as the point-of-sale example given above), this is because of the inconvenience of continually swapping cards. In other cases, such as a card-controlled photocopier or a payphone, this is because the ejection of the controlling smartcard from its reader is a signal to terminate the current session. This is a disadvantage in situations where cost is important or space does not permit the use of two readers.

In addition, memory real estate on smartcards is expensive, and this mitigates against use of smartcards for cost-sensitive user interface applications, particularly since this type of user interface is typically a "throwaway" type of device.

SUMMARY OF THE INVENTION

It is an object of the present invention to substantially overcome, or at least ameliorate, one or more disadvantages of existing arrangements.

According to one aspect of the invention, there is provided a method of using multiple smartcards with a single reader, wherein the method comprises; initiating a session of an application when a first smartcard associated with the application is inserted into the reader; maintaining said session active when the first smartcard is removed from the reader and a second smartcard associated with the first smartcard is to be inserted in the reader; and performing an action when a said second smartcard is inserted in the reader.

According to another aspect of the invention, there is provided a system for using multiple smartcards, wherein the system comprises: a single card reader; a processing device having a controlling program operating therein; communication means for communicating between said single card reader and said processor, wherein said controlling program comprises: means for initiating a session of an application when a first smartcard associated with the application is inserted into the reader; means for maintaining said session active when the first smartcard is removed from the reader and a second smartcard associated with the first smartcard is to be inserted in the reader; and means for performing an action when a said second smartcard is inserted in the reader.

According to another aspect of the invention, there is provided a computer readable medium comprising a computer program for interfacing between an application and a single smartcard reader, wherein the computer program comprises: means for initiating a session of an application when a first smartcard associated with the application is inserted into the reader; means for maintaining said session active when the first smartcard is removed from the reader and a second smartcard associated with the first smartcard is to be inserted in the reader; and means for performing an action when a said second smartcard is inserted in the reader.

According to another aspect of the invention, there is provided a method of interfacing between an application and a single smartcard reader, wherein the method comprises: initiating a session of an application when a first smartcard associated with the application is inserted into the reader and a controlling program operating on a processing device is in a first mode; terminating the session of the application when the first smartcard is removed from the reader and the controlling program operating on said processing device is in the first mode; changing the operation of the controlling program from the first mode to a second mode in response to a message from the session of the application that one or more second smartcards associated with the application is able to be inserted in the reader; waiting for a said second smartcard associated with the application to be inserted in the reader when the first smartcard is removed from the reader and the controlling program is in a second mode; and passing data from a said second smartcard to the application when the said second smartcard is inserted in the reader and the controlling program is in a second mode.

According to another aspect of the invention, there is provided apparatus for interfacing between an application and a single smartcard reader, wherein the apparatus comprises: means for initiating a session of an application when a first smartcard associated with the application is inserted into the reader and a controlling program operating on a processing device is in a first mode; means for terminating the session of the application when the first smartcard is removed from the reader and the controlling program operating on said processing device is in the first mode; means for changing the operation of the controlling program from the first mode to a second mode in response to a message from the session of the application that one or more second smartcards associated with the application is able to be inserted in the reader; means for waiting for a said second smartcard associated with the application to be inserted in the reader when the first smartcard is removed from the reader and the controlling program is in a second mode; and means for passing data from a said second smartcard to the application when the said second smartcard is inserted in the reader and the controlling program is in a second mode.

According to another aspect of the invention, there is provided a computer readable medium comprising a computer program for interfacing between an application and a single smartcard reader, wherein the computer program comprises: means for initiating a session of an application when a first smartcard associated with the application is inserted into the reader and a controlling program operating on a processing device is in a first mode; means for terminating the session of the application when the first smartcard is removed from the reader and the controlling program operating on said processing device is in the first mode; means for changing the operation of the controlling program from the first mode to a second mode in response to a message from the session of the application that one or more second smartcards associated with the application is able to be inserted in the reader; means for waiting for a said second smartcard associated with the application to be inserted in the reader when the first smartcard is removed from the reader and the controlling program is in a second mode; and means for passing data from a said second smartcard to the application when the said second smartcard is inserted in the reader and the controlling program is in a second mode.

According to another aspect of the invention, there is provided a method of using multiple smartcards in a system comprising a processing device and a single card reader communicating therewith, wherein the method comprises: initiating a session of an application when a first smartcard associated with the application is inserted into the reader and a controlling program operating on said processing device is in a first mode;

terminating the session of the application when the first smartcard is removed from the reader and the controlling program operating on said processing device is in the first mode; changing the operation of the controlling program from the first mode to a second mode in response to a message from the session of the application that one or more second smartcards associated with the application is able to be inserted in the reader; waiting for a said second smartcard associated with the application to be inserted in the reader when the first smartcard is removed from the reader and the controlling program is in a second mode; and performing an action when a said second smartcard is inserted in the reader and the controlling program is in a second mode.

According to another aspect of the invention, there is provided a system for using multiple smartcards, wherein the system comprises: a single card reader; a processing device having a controlling program operating therein; communication means for communicating between said single card reader and said processor, wherein said processing device comprises: means for initiating a session of an application when a first smartcard associated with the application is inserted into the reader and the controlling program operating on said processing device is in a first mode; means for terminating the session of the application when the first smartcard is removed from the reader and the controlling program operating on said processing device is in the first mode; means for changing the operation of the controlling program from the first mode to a second mode in response to a message from the session of the application that one or more second smartcards associated with the application is able to be inserted in the reader; means for waiting for a said second smartcard associated with the application to be inserted in the reader when the first smartcard is removed from the reader and the controlling program is in a second mode; and means for performing an action when a said second smartcard is inserted in the reader and the controlling program is in a second mode.

According to another aspect of the invention, there is provided a method of using multiple smartcards, aggregated into a lesser plurality of groups of said smartcards, said method comprising the steps of: (a) inserting a first smartcard into a smartcard reader; (b) reading and storing, if said first smartcard is a base smartcard, (i) an identity for a group, (ii) an identity of the base smartcard, (iii) an interface description for the base smartcard, (iv) an identity for at least one associated member card, and (v) an interface description for said at least one associated member card; (c) ejecting the first smartcard from the smartcard reader and inserting a second smartcard therein, said smartcard reader making accessible a user selectable icon, having an associated action, on a surface of the inserted second smartcard; (d) reading, if said second inserted smartcard is a member card associated with said base smartcard, of (i) said identity of said group, to which said second inserted smartcard is associated, and (ii) an identity of the inserted associated member smartcard; (e) comparing the group identity read from the first smartcard to the group identity read from the second smartcard; and (f) enabling, because said compared group identities match, the associated action if a user selects the user selectable icon, whereby the association between the icon and the action is defined by the interface description for the associated member smartcard read and stored from the associated base smartcard.

According to another aspect of the invention, there is provided a method for enabling smartcard initiated actions associated with a group of smartcards comprising a base smartcard and at least one associated member smartcard, said method comprising steps of: inserting the base smartcard into a smartcard reader; reading of base smartcard data and first data for the associated member smartcard form the inserted base smartcard; inserting the member smartcard into the smartcard reader; reading of second data from the inserted member smartcard; and enabling a smartcard initiated action associated with the member smartcard dependent upon a correspondence between the first data and the second data.

According to another aspect of the invention, there is provided apparatus for using multiple smartcards, aggregated into a lesser plurality of groups of said smartcards, said apparatus comprising: means for reading and storing from a first smartcard, if said first smartcard is a base smartcard, (i) an identity for a group, (ii) an identity of the base smartcard, (iii) an interface description for the base smartcard, (iv) an identity for at least one associated member card, and (v) an interface description for said at least one associated member card; means for reading from a second smartcard, if said second smartcard is a member card associated with said base smartcard, of (i) said identity of said group, to which said second inserted smartcard is associated, and (ii) an identity of the inserted associated member smartcard; means for comparing the group identity read from the first smartcard to the group identity read from the second smartcard; and means for enabling an action associated with a user selectable icon, if said compared group identities match, and if a user selects said user selectable icon, whereby the association between the icon and the action is defined by the interface description for the associated member smartcard read and stored from the associated base smartcard.

According to another aspect of the invention, there is provided apparatus for enabling smartcard initiated actions associated with a group of smartcards comprising a base smartcard and at least one associated member smartcard, said apparatus comprising: means for reading of base smartcard data and first data for said at least one associated member smartcard form a base smartcard inserted in a smartcard reader; means for reading of second data from a said member smartcard inserted in a smartcard reader; and enabling a smartcard initiated action associated with the member smartcard dependent upon a correspondence between the first data and the second data.

According to another aspect of the invention, there is provided a computer readable medium comprising a computer program for interfacing between multiple smartcards, aggregated into a lesser plurality of groups of said smartcards, said computer program comprising: means for reading and storing from a first smartcard, if said first smartcard is a base smartcard, (i) an identity for a group, (ii) an identity of the base smartcard, (iii) an interface description for the base smartcard, (iv) an identity for at least one associated member card, and (v) an interface description for said at least one associated member card; means for reading from a second smartcard, if said second smartcard is a member card associated with said base smartcard, of (i) said identity of said group, to which said second inserted smartcard is associated, and (ii) an identity of the inserted associated member smartcard; means for comparing the group identity read from the first smartcard to the group identity read from the second smartcard; and means for enabling an action associated with a user selectable icon, if said compared group identities match, and if a user selects said user selectable icon, whereby the association between the icon and the action is defined by the interface description for the associated member smartcard read and stored from the associated base smartcard.

According to another aspect of the invention, there is provided a computer readable medium comprising a computer program for interfacing between multiple smartcards, aggregated into a lesser plurality of groups of said smartcards, said computer program comprising: means for reading of base smartcard data and first data for said at least one associated member smartcard form a base smartcard inserted in a smartcard reader; means for reading of second data from a said member smartcard inserted in a smartcard reader; and enabling a smartcard initiated action associated with the member smartcard dependent upon a correspondence between the first data and the second data.

According to another aspect of the invention, there is provided a base smartcard of one or more associated member smartcards, wherein said base smartcard and said one or more member smartcards forming a group of smartcards, each said base or member smartcard comprising memory storage having stored therein a common group number identifying said group and a number identifying said smartcard, and each said member smartcard comprising an interface for user interaction, wherein said memory storage of the base smartcard having further stored therein interface descriptions of each member smartcard.

According to another aspect of the invention, there is provided a member smartcard associated with a base smartcard, wherein said base smartcard and said member smartcard forming a group of smartcards, each said base or member smartcard comprising memory storage having stored therein a common group number identifying said group and a number identifying said smartcard, and said member smartcard comprising an interface for user interaction, wherein said memory storage of the base smartcard having further stored therein interface descriptions of said member smartcard.

BRIEF DESCRIPTION OF THE DRAWINGS

A number of embodiments of the present invention will now be described with reference to the drawings, in which:

FIG. 1 is a perspective view of a smartcard and a smartcard reader;

FIGS. 2–4 are each views of the reverse side of different smartcards;

FIG. 8 shows a flow chart of a method of using multiple smartcards on a single card reader;

FIGS. 10A and 10B show a control flow diagram of the session manager of FIG. 9;

DETAILED DESCRIPTION INCLUDING BEST MODE

Figure 5:
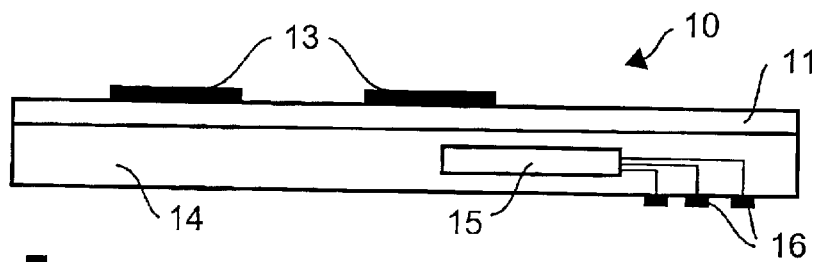
FIG. 5 is a longitudinal cross-sectional view through the line V—V of FIG. 2.

Where reference is made in any one or more of the accompanying drawings to steps and/or features, which have the same reference numerals, those steps and/or features have for the purposes of this description the same function (s) or operation(s), unless the contrary intention appears.

The principles of the method(s) described herein have general applicability to smartcards in general. However, for ease of explanation, the steps of the method(s) are described with reference to smartcard interface systems in which a single application has multiple interface cards. Smartcards used in such systems have a large number of fields of use due to the customisable nature of the user interface. However, it is not intended that the present invention be limited to these described smartcards and systems. For example, the invention may include applications where one or more of the multiple cards used are "standard smartcards". The "standard smartcard" typically does not have a user operable interface on the card itself. The terms "smartcards" and "cards" are used herein interchangeably.

In FIG. 1, there is illustrated a smartcard reader 1 having a housing 2 in which is formed a bay 4 and a viewing area 6. Data reading means are provided in the form of exposed reader contacts 7 and associated control circuitry (not illustrated). The smartcard reader 1 also includes key means in the form of a substantially transparent pressure sensitive membrane 3, which covers the viewing area 6. The smartcard reader 1 is configured for use with a smartcard 10 which has a planar, preferably laminar, substrate 12 with a plurality of indicia 13 on its front face. As best seen in FIG. 5 the indicia 13 can be applied by printing, by adhering, or any other conventional process. As also seen in FIG. 5, the smartcard 1 includes an electronic memory in the form of an on-board memory chip 15 which is connected with card contacts 16 which cooperate with the reader contacts 7.

In use, the smartcard 10 is inserted into the bay 4 with its front face 11 facing towards the pressure sensitive membrane 3. As a consequence the pressure sensitive membrane 3 covers the front face 11 but the control indicia 13 are visible within the viewing area 6 because the pressure sensitive membrane 3 is transparent.

The reader contacts 7 and associated circuitry are configured to read mapping data associated with the control indicia 13 stored in the memory chip 15. This reading can take place either automatically upon insertion of the smartcard 10 into the bay 4 or selectively in response to a signal from the smartcard reader 1. This read signal can, for example, be transmitted to the smartcard reader 1 via the exposed reader contacts 7 and card contacts 16.

Once the mapping data associated with the indicia 13 has been read, a user can press areas of the pressure sensitive membrane 3 overlying or immediately adjacent to the underlying indicia 13. By sensing the pressure on the pressure sensitive membrane 3, and referring to the mapping data, the smartcard reader 1 can deduce which of the indicia 13 the user has pressed. In this way, although the indicia 13 have no mechanical or electrical function, when placed under the transparent pressure sensitive membrane 3, the indicia effectively become keys operable by the user and the function of the key is determined by the mapping data.

In its preferred form, the smartcard reader 1 includes a transceiver, which utilises an aerial 5 for transmitting and receiving radio frequencies. The transceiver circuit is not illustrated but is of conventional form but it will be understood by those skilled in the art that an infra-red transmitter or other forms of data transmission, including hard wiring, can be used.

Upon selection of one of the indicia 13, the smartcard reader 1 causes information related to the selection to be transmitted via the aerial 5 to a set top box 21 (FIG. 6) which includes a corresponding aerial and associated transceiver 25. Thus in the preferred form, information can be transmitted between the set top box 21 and the smartcard reader 1 in both directions and can include, for example, hand shaking data, set up information, or any other form of information desired to be transferred between the two devices. Alternatively, the smartcard reader 1 causes information related to the selection to be transmitted via the aerial 5 to a PC 31 which includes a corresponding aerial and associated transceiver 25. Thus in this variation, information can be transmitted between the PC 31 and smartcard reader 1 in both directions.

Turning now to FIG. 3, there is shown an alternative arrangement 100 to the smartcard 10 of FIGS. 1 and 2. In the smartcard 100 indicia 13 are (as before) provided on the front face (not illustrated in FIG. 3). However the memory storage for the smartcard 100 takes the form of a magnetic strip 115 formed along the rear face 114 of the smartcard 100. The mapping data and any other information, which is stored in the magnetic strip 115 is stored in conventional manner. The smartcard reader (not illustrated) which is adapted to cooperate with the smartcard 100 includes a magnetic read head positioned at, or adjacent, the corresponding bay of the reader. As the control card 100 is inserted into the bay the mapping data is automatically read from the magnetic strip 115 by the magnetic read head. In all other respects the magnetic card reader for the smartcard 100 is then operated as described in relation to the arrangement of FIG. 1.

FIG. 4 shows another arrangement of a smartcard 200 in which the storage means takes the form of a machine-readable bar code 215 printed on the rear face 214 of the smartcard 200. The mapping data, etc is encoded within the bar code. The corresponding smartcard reader (not illustrated) for the smartcard 200 includes an optical read head positioned at, or adjacent, the entrance to the reader bay. As the smartcard 200 is slid into the bay, the mapping data, etc is automatically read from the bar code 215 by the optical read head. Alternatively, the bar code can be scanned using a bar code reader associated with the smartcard reader immediately prior to inserting the smartcard, or can even be scanned by an internal bar code reader scanner once the smartcard 200 has been completely inserted into the smartcard reader.

The present invention has been described herein with reference to specific storage means used in combination with a smartcard. However, it is not intended that the the smartcards of the present invention be limited to these described storage means. As will become apparent to the person skilled in the art, many other possible known storage means may be used in combination with the smartcard without departing from the spirit and the scope of the invention.

Figure 6:
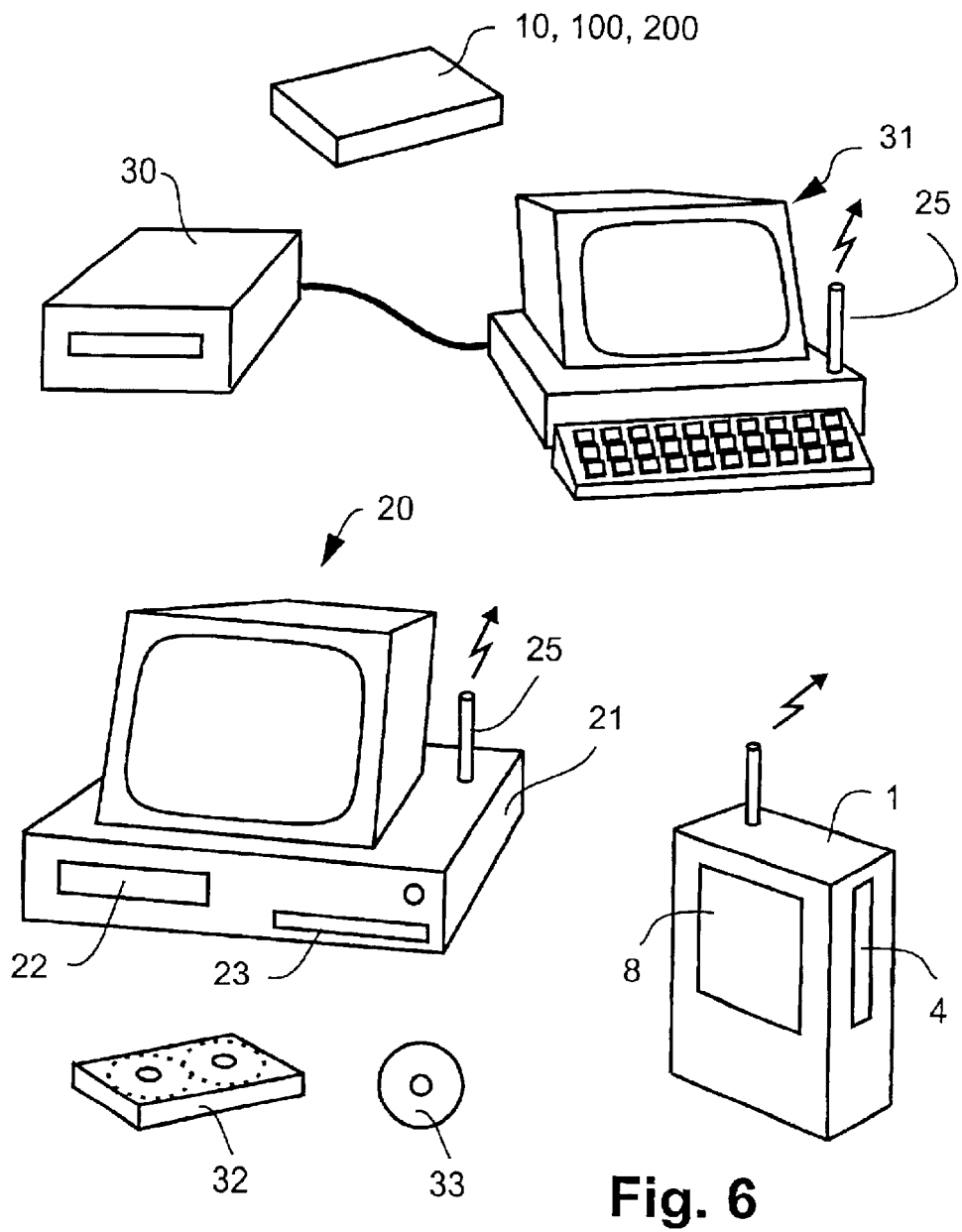
FIG. 6 is a schematic perspective view of all the items of equipment, which go to make up the system.

Turning now to FIG. 6, components of a preferred system are illustrated. In addition to the smartcard 10 (100 or 200) there is a smartcard programmer 30 which is connected to, and controlled by, a personal computer (PC) 31. When the smartcard 10, 100, 200 is inserted in the smartcard programmer 30, data entered into the PC 31 can be used to program the memory chip 15, magnetic strip 115 or bar code 215. The system also comprises a smartcard reader 8 for reading the programmed smartcard 10 (100 or 200). The smartcard reader 8 in response to a user selection of the indicia 13 on the smartcard 10 (100 or 200) causes information related to the selection to be conveyed to a set top box 21, such as a VCR or DVD unit via a corresponding aerial 25 and associated transceiver. The set top box 21 is coupled to a visual display unit 20, wherein the set top box 21 in conjunction with the display unit 20 is able to perform certain video operations in response to the user selection. Alternatively, the system may comprise a smartcard reader and PC 31 adapted to communicate with the smartcard reader 1 via a corresponding aerial and associated transceiver, wherein the PC 31 is able to perform certain operations in response to the user selection. As will become apparent from below, other variations of the system are possible without departing from the spirit or scope of the invention.

Figure 7A:
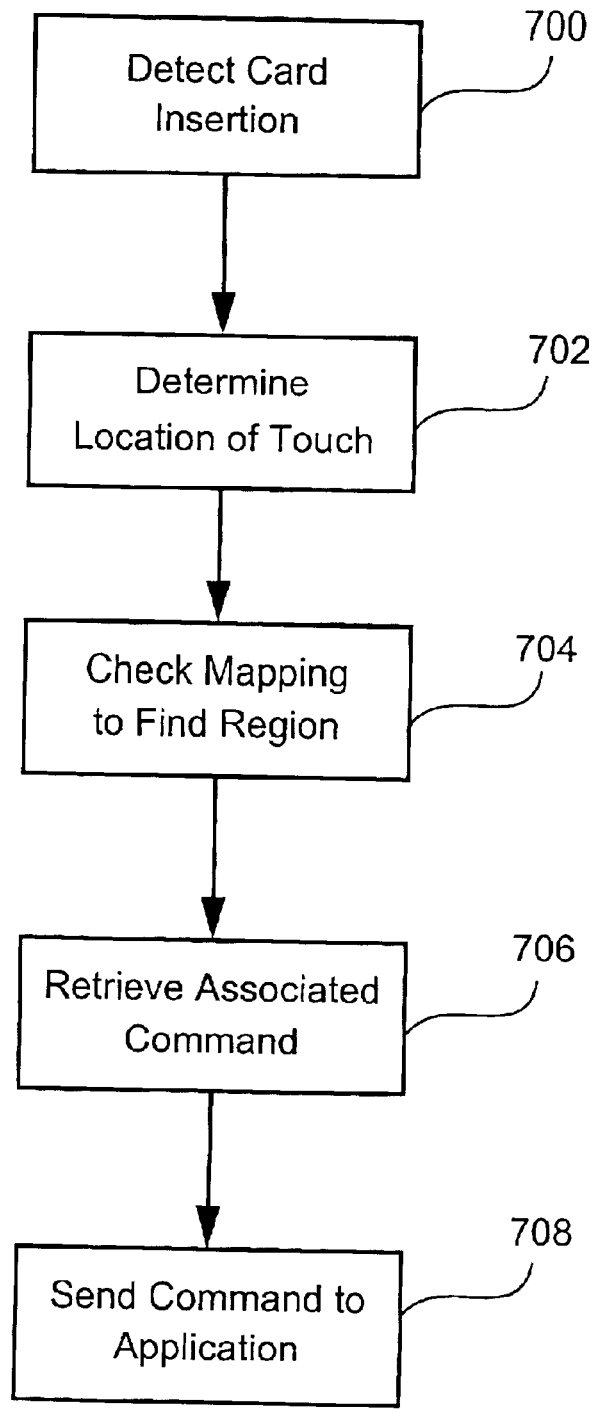
FIG. 7A shows a process flow diagram from the perspective of the card reader into which a smartcard as described is inserted.

FIG. 7A presents a process flow diagram from the perspective of the card reader into which a smartcard as described is inserted. In a process step 700 the card insertion is detected, whereafter in a process step 702, the card reader detects that the user has touched one of the designated regions. In the initial detection step 700, the card reader preferably retrieves from the smartcard memory, an unique identifier and address of the application associated with the card. In the following process step 704, the card reader makes reference to mapping information in order to identify the particular region pressed by the user, whereafter in step 706 the command associated with the particular region in question is retrieved from a memory. In a process step 708, the particular command being requested through touching the specified region is sent to the application in question.

The smartcard as described has stored in its memory a list of x-y coordinates and commands associated with the "buttons", "icons", and/or "regions" (viz the printed indicia) of the smartcard. For instance, each member of the list may have the syntax {TL,BR, "COMMAND"}, where TL and BR are the x-y coordinates of the top left hand corner and bottom right hand corner respectively of the associated "button", "icon" or "region" on the smartcard, and where "COMMAND" is the associated command to be performed by pressing the associated "button", "icon", or "region" (ie printed indicia). Some examples of "COMMAND" may be load URL address, load application, or down load file etc. Preferably, the syntax allows multiple commands for each TL, BR coordinate. For instance, a member of the list may comprise in addition to a command designated by the "button", a further command for retrieving and playing a particular sound sample for feedback to the user as previously described. Preferably, the smartcard has also stored in its memory an unique identifier number. The latter information being automatically read by the reader upon insertion of the smartcard in the reader. Alternatively, the latter information may be read upon the user pressing the pressure sensitive membrane over a start "button" of the card. In a further variation, the list may instead be stored in memory in the set top box 21 or PC 31 together with its unique ID number. In the latter case, the smartcard need only store the unique ID number.

Figure 7B:
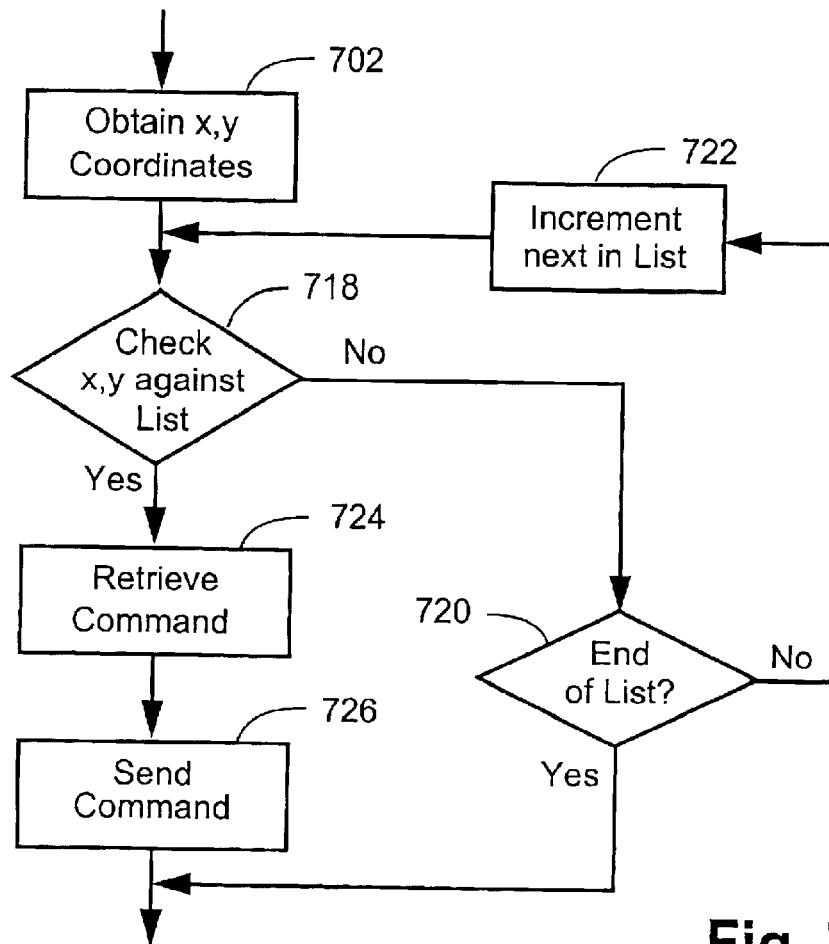
FIG. 7B shows in more detail the processes of steps 702 to 712 of FIG. 7A.

Turning now to FIG. 7B, there is shown in more detail the processes of steps 702 to 712 of FIG. 7A. In a process step 702, the card reader determines the x-y coordinates of the area on the smartcard, which has been pressed by the user. The process then continues to decision block 718, where a check is made by the card reader whether these pressed x-y coordinates match the coordinates TL, BR of a first member {TL, BR, "COMMAND"} of the list, which has been retrieved from memory in the smartcard. If the x-y coordinates pressed by the user do not match to the coordinates TL, BR of the first member then the decision block 718 returns false (no) and the process continues to decision block 720. In decision block 720, a check is made whether the current member of the list is the last member of the list. If the decision block 720 returns false (no) then the process continues to process step 722, where the card reader increments to the next member of the list. Otherwise if the decision block 720 returns true (yes), the process then terminates awaiting further user input. The card reader, thus increments through the list, checking the TL, BR coordinates of each member against the pressed x-y coordinates until a match is found. If no match is found the process terminates.

In the event the decision block 718 returns true (yes), that is if the pressed x-y coordinates match the TL, BR coordinates of a member {TL, BR, "COMMAND"} of the list, then the process continues to process step 724. Preferably, TL and BR define a region or area on the smartcard and a match is found when the x-y coordinates of the area pressed by the user fall or partly fall within the region or area defined by TL and BR. In the next process step 724, the card reader retrieves the "COMMAND" associated with the matched coordinates and then sends 726 the "COMMAND" to the particular application in question. The card reader already knows the unique identifier and address of the application from the initial detection of the card. After step 726, the process then terminates awaiting further user input.

Figure 7C:
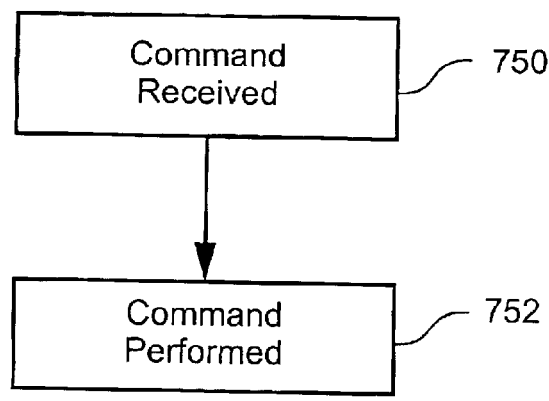
FIG. 7C shows a process flow diagram from the perspective of the application associated with a smartcard as described.

FIG. 7C presents a process flow diagram from the perspective of the application associated with a smartcard as described. There are many different configurations of applications suitable for use with the smartcards. For instance, the application can be located remotely on a server. Alternatively, it can also be located locally on a personal computer. The application can also be located in a set top box, such as a VCR. Also, the application can either be implemented as software or hardware. For instance, the card reader may send a series of bits to a TV to remotely change the channels.

For the purposes of this specification, any reference hereinafter to a processing device is taken to include within its meaning a set top box (such as shown in FIG. 6), a PC (such as shown in FIG. 6), a remote server, ATM device, or any other device of computational ability, which is adapted to communicate with the smartcard reader and perform operations in response to user interaction with the smartcard and smartcard reader. Such a processing device preferably includes an input/output device for communicating with the smartcard reader 8. The processing device preferably also includes a microprocessor and memory coupled to the input/output device, the microprocessor being adapted to perform operations in response to user interaction with the smartcard and smartcard reader.

Turning now to FIG. 7C, the process of the application that is currently running on the processing device is described. In the process step 750, the application receives a "COMMAND" from the card reader corresponding to the "icon", "button" or "region" on the smartcard pressed by the user. The application in the next process step 752, performs the "COMMAND". For instance, the application can be an internet browser and the command "load a URL address". In another example, the application can be a telephone communications package in a telephone and the COMMAND is "Phone 999 9999".

Preferably, the application is automatically executed once the card is inserted in the reader. In this embodiment, an overall controlling program receives a command "execute APPLICATION" (where the application is specified by an address) upon insertion of the card in the reader and subsequently executes the application. In a variation of this embodiment, the application is executed once the card is inserted in the reader and the user presses a "START" button on the smartcard. In a still further embodiment, the application is already running and waiting to receive commands from the reader. In the latter embodiment, upon insertion of the smartcard in the card reader, the card reader retrieves from the smartcard memory, a unique identifier associated with the card. It will be noted it is not necessary to store the address of the application on the smartcard as the application is already running. The overall controlling program, in the latter embodiment, then checks whether the unique ID corresponds to the ID of the already executing application and if not issues a warning signal, eg a audible beep.

In a still further variation of the preferred embodiment, the mapping data together with a unique ID can be stored remotely on the processing device. In this variation, the storage means of the smartcard 10 (100 or 200) has instead of mapping data, a unique ID associated with the smartcard 10 (100 or 200) stored therein. Upon the initial reading of the smartcard 10 (100 or 200), this ID is passed from the smartcard reader 1 to the processing device. Once a user selects one of the indicia 13, the smartcard reader 1 causes locational data indicating the location of the pressed indicia to be passed to the processing device. The processing device checks whether the unique ID of the smartcard 10 (100 or 200) corresponds to the unique ID associated with the mapping data stored on the processing device. If the IDs do not correspond, the processing device recognizes that this smartcard 10 (100 or 200) is an inappropriate smartcard 10 (100 or 200), and issues a warning such as an audible beep. On the other hand, if the IDs do correspond the processing device performs the command(s) associated with locational data.

For the purposes of this specification, any reference hereinafter to the term "session" refers to an instance of a software application intended for execution or already executing on a processing device. Furthermore, the reference to the term "initiating a session" includes within its scope but is not limited thereto: executing the software application, loading data into the software application for use in that session (eg loading a web page from the Internet or loading a video), resetting the state of the software application ( eg setting displayed variables to their default values), or some other form of session initiation. The reference to the term "terminating a session" includes within its scope but is not limited thereto: terminating the software application, loading default data into the software application, resetting the state of the software application, or some other form of session termination.

Turning now to FIG. 8, there is shown a flow chart of a method of using multiple smartcards on a single card reader. A controlling smartcard 10 (100 or 200) has preferably stored in its memory storage means 15, 115, 215 a unique identifier of an application and optionally an address to the application, such as for example an Internet home shopping program. The method commences 802 when the user inserts the controlling smartcard 10 (100 or 200) into the smartcard reader 8. When the controlling card is inserted into the smartcard reader 8, the reader automatically causes a session of the application to be initiated 804 on the processing device utilizing the unique identifier of the application or optionally the address to the application. Alternatively, the session may be initiated 804 by the user pressing a Start "button" on the controlling smartcard 10 (100 or 200), by the user pressing on the pressure sensitive region. Once the session has started the user is able to commence interaction with the program via the "buttons" on the controlling smartcard 10 (100 or 200). If the user is solely interacting with the application with the controlling smartcard, then the program runs until the user ejects 820 the controlling smartcard 10 (100 or 200) from the reader 8 whereupon the session is terminated 822. However, the application in response to a user interaction may request further information from the user. For example, if the user wishes to buy something on the Internet home shopping program, the program may ask for a shipping address. In order to avoid having to provide a keyboard to enter the information, the information is held on a second smartcard 10 (or 100 or 200).

Preferably as mentioned previously, each smartcard 10 (100 or 200) holds a unique identifier that labels it as corresponding to a particular application. When a controlling smartcard 10 (100 or 200) is inserted 802 into the reader 8, the unique identifier, such as "HomeShopping", causes an overall controlling program on the computer system to start 804 a session of the application indicated. The user may then commence user interaction 806 with the application.

The application during this user interaction 806 checks in decision block 808 whether the user has performed a particular user interaction. In a variation of this arrangement, the application may, instead of in response to an user interaction, automatically request and wait 810 for a second smartcard. In this case, the decision block 808 can be dispensed with. In the event the decision block 808 returns Yes (TRUE), the application proceeds to step 810, where the application requests and then waits for the insertion of the second smartcard 10 (100 or 200). The application, for instance the home shopping application, also sends during step 810 a message to the overall controlling program, naming the unique identifier of the second smartcard 10 (100 or 200), say "PersonalInfo". In this fashion, the overall controlling program is aware that a second smartcard has been requested and it knows the identity of the second smartcard. Consequently the change of the smartcard does not trigger a session change, i.e. the termination of the HomeShopping application and the starting of a PersonalInfo application. The waiting step 810 may have a timeout period after which the session is terminated. After such a period, the insertion of a card would be treated as the insertion of a controlling card.

After the user has inserted 818 the second smartcard 10 (100 or 200), the method proceeds to decision block 814. During decision block 814, the overall controlling program checks whether the unique identifier of the inserted second smartcard 10 (100 or 200) is the same as the unique identifier of the requested smartcard currently stored by the overall controlling program. In the event, the decision block 814 returns No (FALSE), the method proceeds to decision block 816. During decision block 816, the overall controlling program checks whether the unique identifier of the inserted second smartcard 10 (100 or 200) is the same as the unique identifier of the application currently stored by the overall controlling program. In the event the decision block 816 returns Yes (TRUE), the method returns to the application for further user interaction 806. On the other hand, if decision block 816 returns No (FALSE), the method returns to step 804. Namely, if the newly inserted smartcard is not the second or the controlling smartcard, the session is terminated and a new session corresponding to the new controlling card is started. In a variation of this method, where the decision block 816 returns No (FALSE), the user is warned that the current session is to terminate and gives the user a chance to insert the correct card. If the user has not inserted the correct card within a predetermined period, the session is terminated and a new session corresponding to the new controlling card is commenced. On the other hand, if the decision block 814 returns Yes (TRUE), the method proceeds to step 812, where the application performs an action using the information stored on the second smartcard 10 (100 or 200). After completion of step 812, the method returns to step 806 for further processing. In the event the decision block 808 returns No (FALSE), that is the user has not performed the particular user interaction, the application continues operation with further user interaction. The application runs until the user ejects 820 the controlling smartcard 10 (100 or 200) from the reader 8 whereupon the session is terminated 822.

In this way, the method is able to distinguish those instances where the removal of a card is intended to signal the end of a session from those instances where the removal of a card is done in order to insert a different card required in the same session and hence leaving the current session active.

Figure 9:
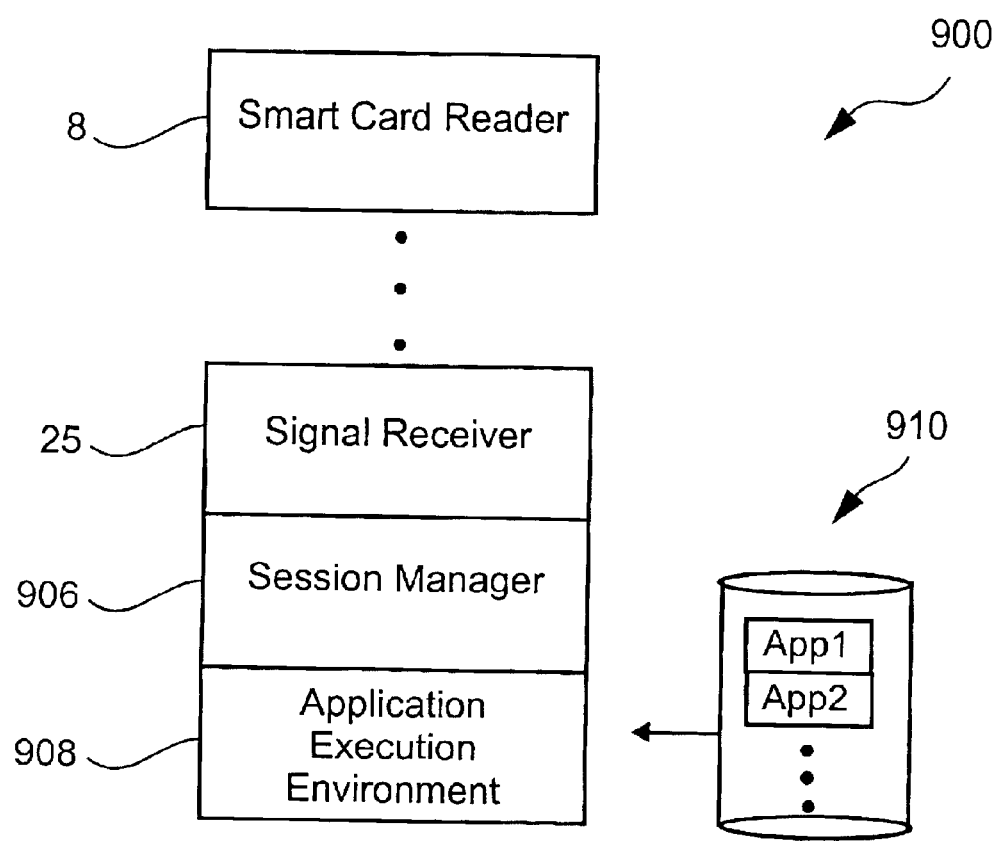
FIG. 9 shows a schematic block diagram of the system for implementing the method of FIG. 8.

Turning now to FIG. 9, there is shown a schematic block diagram of the system for implementing the method of FIG. 8. The system comprises a smartcard reader 8 including a transceiver, a signal receiver 25, a session manager 906, an application execution environment 908, and a set of stored application programs 910. The session manager 906 is the overall controlling program described previously and runs on the aforementioned processing device. The stored applications 910 are executed in an execution environment 908 on a microprocessor in the aforementioned processing device. The applications may be stored locally on the processing device or remotely on a network.

The smartcard reader 8 sends signals corresponding to card insertion, card removal, and card operations as discussed previously, which are received by the signal receiver 25. The session manager 906 communicates with the signal receiver 25 via an application programming interface such that it is notified of these card events by messages, namely card insertion, card removal, and card operations. The session manager 906 controls the loading, execution and termination of the applications in the application execution environment 908 and communicates with these applications, for example using inter-process communication.

Figure 10B:
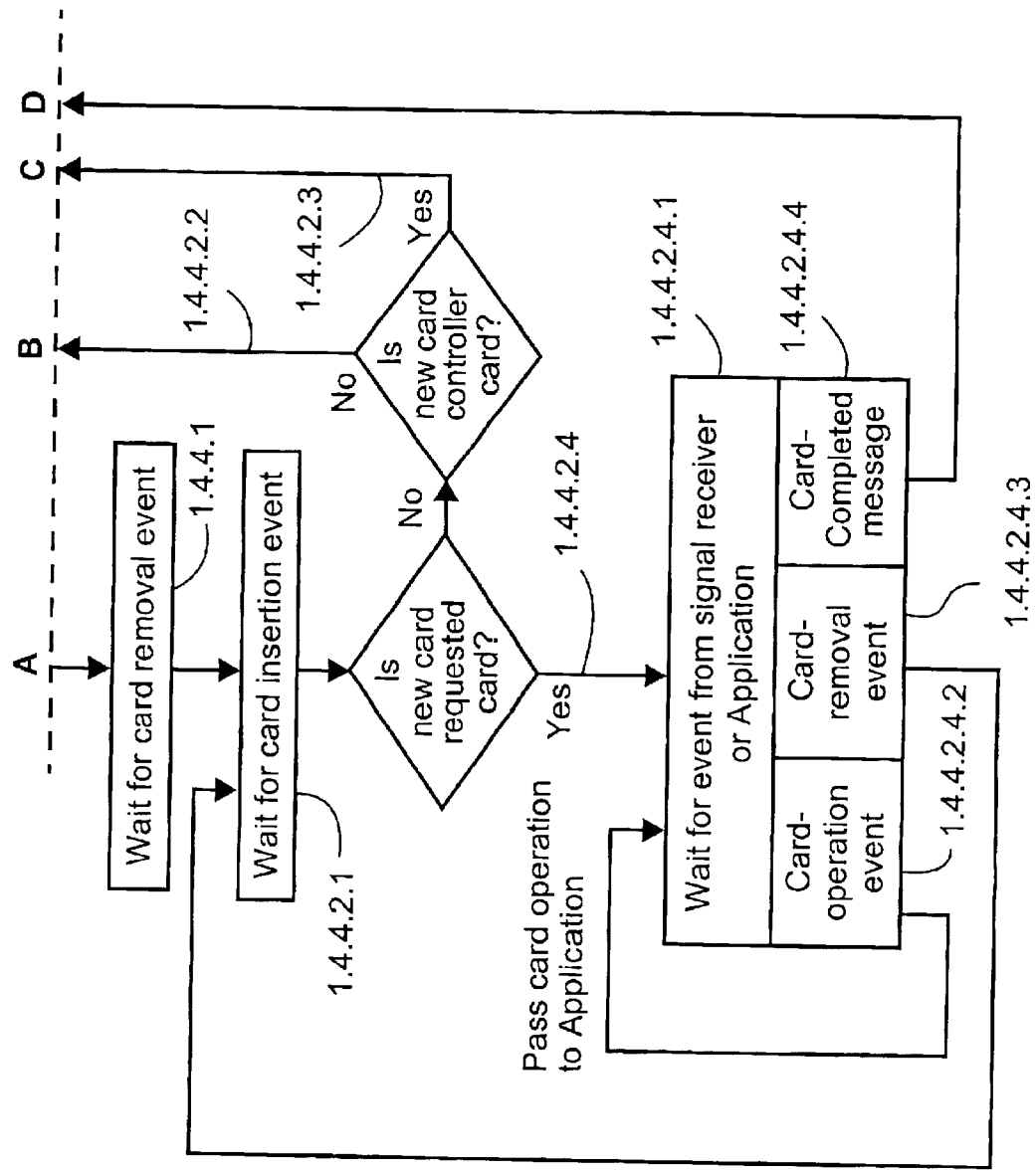

The session manager 906 can be implemented using the following high level pseudo-code. This pseudo-code implementation of the session manager is depicted in FIGS. 10A and 10B as a control flow diagram. For ease of explanation, the reference numerals in the following pseudo-code correspond to the reference numerals shown in FIGS. 10A and 10B.

Pseudo-code—Session Manager:
(1) While power is on, repeat the following:
  (1.1) Wait for card insertion event from signal receiver.
  (1.2) Determine application to execute from card insertion event. The data sent with the card insertion event comprises a name or unique identifier for the application.
  (1.3) Load and execute store application in the application execution environment.
  (1.4) While application is executing, repeat the following:
    (1.4.1) Wait for event from signal receiver or message from the executing application.
    (1.4.2) If card-removal event received, terminate application and exit this loop. Namely go to 1.1.
    (1.4.3) If card-operation event received, pass this card operation onto the executing application, for example by inter-process communication and goto 1.4.1.
    (1.4.4) If new-card request message received from application (with details of necessary criteria which the new card must match i.e ID), do the following:
      (1.4.4.1) Wait for card-removal event. The application would have prompted the user to remove the card and insert another card to be used by the executing application.
      (1.4.4.2) Repeat the following:
        (1.4.4.2.1) Wait for card-insertion event.
        (1.4.4.2.2) If the new card does not match the criteria specified by the new card request message and is not the controlling card, exit this loop and the outer one and goto 1.2. The inserted card is treated as a new controlling card. In a further variation, the session manager would warn the user that the current application is to terminate and give the user an opportunity to insert the correct card.
        (1.4.4.2.3) If the new card is the controlling card associated with the executing application, exit this loop and goto 1.4.1.
        (1.4.4.2.4) If the new card matches the requested criteria, repeat the following:
          (1.4.4.2.4.1) Wait for event from the signal receiver or message from the application.
          (1.4.4.2.4.2) If card-operation received, pass this card operation on to the executing application by, for example, inter-process communication.
          (1.4.4.2.4.3) If card removal event received, exit this loop and goto 1.4.4.2.1.
          (1.4.4.2.4.4) If a card-completed message is received from the executing application, exit this loop and goto 1.4.1

The session manager 906 effectively operates in two modes. In the first mode, if a card insertion event is detected the corresponding application is loaded and executed, while if a card removal event is detected the application is terminated. In the second mode, if a card removal event is detected following receipt of a new card requested message, the application is not terminated but waits for the insertion of a second smartcard. If a card insertion event is detected following receipt of a new card requested message, and the newly inserted card satisfies the criterion specified, the session manager 906 will read the newly inserted second smartcard.

Although the above pseudo-code discusses card-insertion events and card-removal events, these events may not correspond with signals sent from the reader to the receiver. The session manager can infer these events by examining the card-operation events and determining whether consecutive operations have come from the same card or not.

The method described with reference to FIG. 8 is concerned with executing an application upon insertion of the controlling card. In a variation of this method, the application is running prior to the insertion of the controlling card. That is, the application is continually operating during the power on the processing device, prior to the insertion and after the removal of the controlling card. When the controlling card is first inserted, this variation of the method checks whether the unique identifier of the controlling card corresponds to the unique identifier of the application. If the IDs correspond, the method commences a session of the application. Otherwise, the method warns that the current session will terminate and gives the user a chance to insert the correct card. In the event the IDs correspond, this variant method then proceeds with steps 806 through to 820. After step 820, the variant terminates the current session.

The session manager 906 effectively operates in two modes. In this variation of the method, the session manager 906 is modified to take into account these changes. Notwithstanding, the session manager of the method of FIG. 8 and session manager of this variant method operate in similar fashion. Namely in a first mode, if a card insertion event is detected a session is commenced (eg the corresponding application is loaded and executed or an instance of the application is initiated), while if a card removal event is detected the session is terminated (eg the application is terminated or the instance of the application is terminated). In the second mode, if a card removal event is detected following receipt of a new card requested message, the session is not terminated but waits for the insertion of a second smartcard. If a card insertion event is detected following receipt of a new card requested message, and the newly inserted card satisfies the criterion specified, the session manager will read the newly inserted second smartcard.

The method described with reference to FIG. 8 is concerned with an application waiting for the insertion of a specific non-controlling card. In a variation of this method, an application may instead specify any number of constraints for the cards for which it is waiting. These could include, without limitation, cards from a specific vendor, cards associated with a specific application or service, cards which specify conformance to a specific schema, cards specifying a creation date within a specific range, etc. An application may even specify that it is waiting for the insertion of any card (which may be used for example in the case of a card duplication application).

The method described with reference to FIG. 8 is concerned with a method where only one non-controlling card is used. In a variation of this method, a controlling application may place a restriction that there only be one non-controlling card be inserted or it may set a specific limit on the number of non-controlling cards to be inserted in sequence or it may place no limit. For example, an "address book" card may be used for adding addresses to an electronic address book. The address book maintenance application may prompt the user to insert business cards (viz smartcards) so that the addresses they represent can be added to the address book. A user may insert any number of business cards in sequence and, when finished, insert the address book card again to indicate completion.

The method described with reference to FIG. 8 is concerned with a method where the application specifically requests a non-controlling card and waits for the insertion of that card. In a variation of this method, the non-controlling card may be inserted at any time during the running of the application without a specific request of that card from the application. In this variation of the method, the application initially advises the session manager of a list of IDs of all non-controlling cards that are allowed to be used by the application. When the controlling card is removed without a specific request by the application, the session manager first checks whether there are any IDs of allowable noncontrolling cards in the list. If there are none, the session manager terminates the session. If there are some in the list, the method proceeds to step 810 and waits for the insertion of a non-controlling card. When the user inserts a card 818, the method then checks against the list whether the inserted card is an allowable non-controlling card, and if so proceeds to step 812. Otherwise it proceeds to decision block 816. The session is terminated once the controlling card is removed and no other card is inserted within a predetermined period.

The method described with reference to FIG. 8 is concerned with a method where the non-controlling card is used for the reading of data. In a variation of this method, the non-controlling card can be used for any other purpose, including, without limitation, having data read from it, having data written to it, the initiation of an application in the context of the controlling application (for example, a Java applet running within a web page initially loaded by the controlling card), etc. In the latter case, the non-controlling card preferably has stored therein a command to load and execute the subsidiary application, by way of reference to the address of the subsidiary application stored in the processing device.

In a still further variation of this method of FIG. 8, a non-controlling card associated with the main session can be used for the initiation of another sub-session, which in turn can require insertion of a non-controlling card. The method steps of the main session and sub-session operate in similar fashion, excepting that the method returns to the main session once the sub-session is terminated.

A particular application of the method described with reference to FIG. 8, may be used in a system supporting the use of smartcards for access to electronic services. In such a system, a user may use a smartcard (the controlling smartcard) for accessing an electronic service (eg navigating through a list of products in an online shop, interacting with a television service, choosing a video to watch). When the user has made a selection of one or more items to purchase (eg physical items to be delivered such as books as well as electronic services to make use of such as online videos to watch), the system would prompt the user to insert his or her "Personal Information Card" (ie the non-controlling card).

The "Personal Information Card" is a card that has various details stored therein specific to the user including but not limited to: name, address, telephone number, and credit card number.

The user is able to insert the "Personal Information Card" into the card reader and use it to enter whatever details they wish to convey to the electronic service. The entry of this information can be done by touching the transparent touchscreen on the smartcard reader. The "Personal Information Card" can have various fields (such as name, address, credit card) or the instantiated values (eg Mr. Smith) visible on the card itself, and the user can select the relevant information by touching over the appropriate visible indicia. Upon selection, the smartcard reader then reads the selected data from the smartcard and transmits this selected data to the application. The supplied information is then used by the system to complete the purchase In a further variation of this application, the user selects this information by some other means (eg having a menu presented to them which lists the available information read from the smartcard allowing them to choose which information should be given to the electronic service.

In a still further variation of this application, when the user has made a selection of one or more items to purchase, the system would prompt the user to insert his or her conventional smartcard in the reader and obtains the relevant information from this conventional smartcard.

In a still another variation of the aforementioned application, the system has an option for copying data from the Personal Information Card to the home shopping card. For example, if the home shopping card is to be used frequently, it may be more convenient to copy information from the Personal Information Card to the homeshopping card itself. This can be achieved in either of two ways. In the first way, the controlling card is the home shopping card and the non-controlling card is the Personal Information Card. The home shopping card is inserted and possibly used for viewing and ordering online products. After the selection of an option in the home shopping application, the application prompts for insertion of the Personal Information Card to copy personal information to the home shopping card. The user inserts the Personal Information Card and selects what information is to be copied, which is then temporarily stored on the processing device. The application then prompts for the reinsertion of the home shopping card and the stored personal information details are then written to the home shopping card. In the second way, the controlling card is the Personal Information Card and the home shopping card is the non-controlling card. The Personal Information Card is inserted and the Personal Information application displays an option for copying. After the selection of the copying option, the user then selects the personal information which he or she wishes to copy, which is then temporarily stored on the processing device. The application then prompts for the insertion of the target card (ie home shopping card) and the stored personal information details are then written to the home shopping card. In both cases the home shopping card can be used in the future without access to the Personal Information Card.

In another application of the method described with reference to FIG. 8, a system supporting voice or video communications can be operated using multiple smartcards. An initial smartcard, Card A, would be inserted which initiates the application. Card A might comprise an electronic representation of the user's contact details (name, address, etc) which is used by the application (for example, to put in the headers of message sent, or to identify the user in a videoconference). Where Card A is additionally being used as a user interface to the application (eg where the reader has a transparent touchscreen), the card would have controls for the various functions (eg to start recording a video messages and to stop recording). When a user wishes to communicate with somebody (eg send a message or start a live session), he or she inserts Card B, which is a business card, address card or some other card comprising an electronic representation of the person's address. In this context, Card B is being used as a non-controlling card. The address is extracted from Card B by the application requesting this information from the reader, which then reads the information from Card B. Alternatively, where Card B can be used as a user interface, the address is extracted by the user pressing over the appropriate part of Card B, which causes the reader to extract this information from Card B and send it to the application. Where a user wishes to communicate with multiple people simultaneously (eg a video e-mail sent to multiple people, a multi-party audio-conference, etc), multiple business cards or address cards can be inserted in sequence (Cards C, D, E and so on) with each selected person being added to the list of parties. The completion of the list would be indicated by the reinsertion of the controlling card (Card A) or by some other means determined by the application (eg if there is a specific upper limit on the number of cards to be entered).

In a further variation of the method shown in FIG. 8, the non-controlling card may comprise a single address or could comprise multiple addresses, which can be selected from by the user. The process of selection will depend on the nature of the application and the reader but could include selection over a particular position on the card through a transparent touchscreen, selection from a list of addresses extracted from the card and displayed on a screen, etc.

The above mentioned method and variations thereof show that a non-controlling card can be used for various purposes including reading and writing of data. In a further variation of the method, a card that operates as a non-controlling card in a specific context (eg where a controlling card has specified that it is waiting for a card), may also operate as a controlling card in another context (eg where it is inserted when the card-reading system is waiting for a controlling card). For example, a smart business card could be inserted into a reader and used as a means of contacting the person described on the card. The business card could initiate an application, which allows a video-conference with that person to be initiated. This scenario involves it being used as a controlling card. However, in a different scenario, a generic video-conferencing control card may be in operation and the user wishes to add another participant to a conference. The user could place the business card for the person into the reader as a non-controlling card and initiate the person's involvement in the conference.

In a further variation, the preferred method supports an adventure game. In this case, the controlling card, Card F, initiates a game and other cards represent characters, weapons, personality traits, locations or some other object or property. For example, insertion of Card F could initiate the application and display an imaginary world. Card F could then be removed and Card G, representing Character G could then be inserted and Character G would be displayed on the screen. Controls on Card G, seen and used through a transparent touch-screen, could be used to direct Character G through the imaginary world. Character G may discover objects (eg treasure) which a user can save onto Card G using the controls. If the user wants Character G to use Weapon H, the user would remove Card G and insert Card H resulting in a change to the display such that Character G is holding Weapon H. The application would inform the method of the constraints required to be satisfied for the application to stay active. For example, in the case of this application, the application could inform the method that it is waiting for any card which is from the "AdventureGame" game made by the "GreatGames" game development company. This constraint information may be specified by the application in textual form as attribute/value pairs, using data conforming to a structured data format (such as XML), using registered numeric identifiers or by some other means. In this example, if a user were to insert Card X corresponding to a home shopping application which specifies Vendor Y, the method would recognise that this does not satisfy the constraints for the awaited card and would start the corresponding new application.

There are clearly a large number of applications to which the preferred method and its variations thereof apply. These can include the following applications without being limited thereto. In particular application, the controlling card can be used as cardduplicating card. When the card-duplicating card is inserted, it initiates an application which prompts the user to insert the card being duplicated (the "Source Card"). When the user has done this, the application reads from the Source Card and then prompts for the insertion of the "Target Card". The user then inserts the Target Card and the saved contents from the Source Card are copied onto the Target Card. In another application, the controlling card, Card M, supports the searching or browsing of content (eg online music or images) and the purchase or retrieval of all or parts of this content. In this case, when a user requests purchase or retrieval of content, the application would prompt for the insertion of a card, Card N, or multiple cards, for the storage of the content or references to the content. After the content or reference to the content has been stored on Card N, Card N can now act as a controlling card in other contexts. For example, Card N could now be used in the absence of Card M for listening to the previously selected or purchased music.

In a further variation of the preferred method, the insertion of the non-controlling card leads to the execution of an application associated with this non-controlling card but which is run in a different mode or application context than that in which it would be run if the controlling application were not active. For example, a user may have a controlling card for an adventure game. This card, when inserted in a reader, starts the base application, which allows the user to play the adventure game. At some point in the game, the user may insert a card representing a set of weapons for a character to use. The insertion of this card in the context of the running application has the effect that the card is treated as a non-controlling card. In this case an application associated with the new card (either resident on the card, referred to by the card, or associated by some other means with the identified card) would be started but it would be started in a noncontrolling mode. For the card representing a set of weapons, for instance, the application running in a non-controlling mode may result in a selection box being presented to the user to allow them to select a weapon to use. This would differ from the behaviour of the application if running in a controlling context. The insertion of the same card being used as a controlling card would mean that the application would run in a controlling mode and exhibit different behaviour (eg start a weapon management application).

Figure 11:
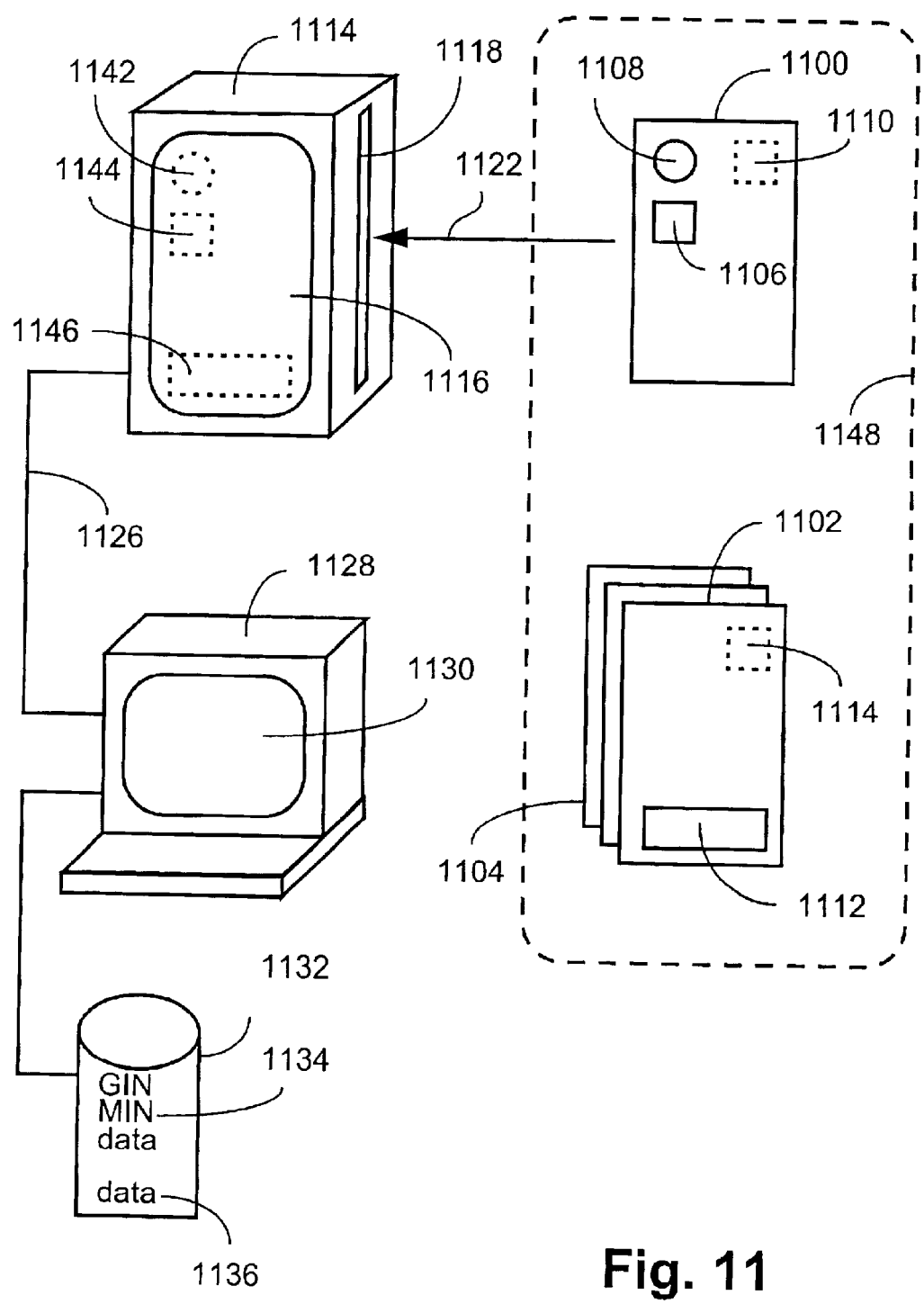
FIG. 11 shows a block diagram representation of a system for using multiple smartcards.

Turning now to FIG. 11, there is shown a block diagram representation of a system for using multiple smartcards in accordance with a further embodiment. In this further embodiment, a smartcard reader 1114 is connected by a data connection 1126 to a processing device 1128. The processing device 1128 is provided with a display 1130 and memory device 1132. The processing device 1128 may be a set top box, a PC, ATM device, or any other device of computational ability, which is adapted to communicate with the smartcard reader 1114 and perform operations in response to user interaction with the smartcard and smartcard reader 1114.

The smartcard reader 1114 has an access aperture 1118 through which a smartcard, eg. 1100 can be inserted as depicted by an arrow 1122. When the card 1100 is so inserted, icons 1108, 1106 are made visible to a user through a control aperture 1116, this accessibility being depicted by icon "ghosts" 1142, and 1144 respectively. The card 1100 can be withdrawn from the smartcard reader 1114, and another card 1102 inserted as before, in which case an icon 1112 on this card 1102 is made accessible to the user through the control aperture 1116, as depicted by a ghost icon 1146. Each of these icons are associated with an action to be performed by the processing device 1128. A transparent pressure sensitive membrane is disposed over the control aperture 1116 and is adapted for user interaction with the icons.

An "action" associated with an icon is preferably performed in the following manner. A desired smartcard (1100, 1102) is inserted into the smartcard reader 1114. The user selects the icon (1106, 1108, or 1112) by pressing that portion of the pressure sensitive membrane residing over the icon. The smartcard reader 1114 senses the location of the selected portion of the pressure sensitive membrane, and in turn transmits this information on the location of the selected portion to the processing device 1128. The processing device 1128 determines the action to be performed that is associated with the selected icon using the location of the selected portion, and initiates the performance of the action. Preferably, the icon/action association is stored in a memory device 1110 on the card 1100, and the smartcard reader 1114 is able to access the contents of the memory device 1110 by means of suitable contacts (not shown) in the reader 114 which engage the memory device 1110 upon inserting the card 1100. The smartcard reader transmits the icon/action association to the memory device 1132 of the processing device 1128 upon insertion of the smartcard in the reader 1114. The cost of manufacturing smartcards is directly proportional to the size of the memory device 1110, and this memory device 1110 is required to store icon/action associations for all icons 1108 on the smartcard 1100.

Preferably, this icon/action association is in the form of an interface description stored in the memory device 1110. This interface description lists x,y coordinates and one or more associated commands. When the user selects an icon by pressing the pressure sensitive membrane over the icon of the inserted card, the smartcard reader determines the x,y coordinates of the area of the pressure sensitive membrane that was pressed by the user and passes this information onto the processing device. The processing device then reads the list and matches the x,y coordinates of the list with the x,y coordinates of the pressed area and performs the one or more commands associated with the matched x,y coordinates.

In this further embodiment of the system, instead of each smartcard being an isolated entity, storing icon/action associations in an on-board memory, a group of smartcards 1100, 1102, . . . , 1104 are configured to provide portable, programmable user interface capability. This group approach advantageously reduces memory requirements for "member" cards 1102, . . . , 1104, at the price of increasing memory capacity of a memory device 1110 in the single "base" card 1100. Accordingly, the base card 1100 contains in the base card memory device 1110, all the icon/action associations for the associated member cards 1102, . . . , 1104. The member cards 1102, 1104 need only store identity information, thereby significantly reducing the requirements for memory capacity in the member card memory device 1114. In aggregate, a relative manufacturing cost of smartcards in such a group is reduced in relation to the isolated smartcard approach.

In this further embodiment of the system, the base card 1100 contains, in the on-board memory device 1110, icon/action association information for all associated member cards 1102, . . . , 1104. This information is preferably in the form of interface descriptions comprising a plurality of records having at least the following fields: member identifier (MIN); x,y coordinates; and one or more associated commands.

The base card also stores a group identifier number (GIN) which is specific to the particular group of which it is a base card. The base card also stores a member identifier number (MIN) unique to itself. The associated member cards 1102, . . . , 1104 need only store the same GIN as the base card 1100, each member card also needing to store a MIN to identify itself. Once the base card 1100 is inserted into the smart card reader 1114, the icon/action association data, GIN and MIN relating to itself are stored in the system memory 1132 as depicted by the reference numeral 1134. Icon/action association data, GIN and MIN relating to associated member cards 1102, . . . , 1104 are stored in the system memory 1132 as depicted by the reference numeral 1136. The base card 1100 can, thereafter, be used as a user interface in its own right, through use of an icon 1108, for example. Alternatively, and in addition, the base card 1100 can be withdrawn from the reader 1114, and any one of the associated member cards 1102, . . . , 1104 inserted into the reader 1114. Although these member cards 1102, 1104 contain only their associated GIN/MIN identifiers, they can nonetheless act as user interfaces, and, for example, a user can select the icon 1112 thereby affecting the corresponding action defined by the relevant icon/action association which was entered by means of the base card 1100.

Accordingly, the system of the further embodiment relies on the concept of a group of cards comprising the base card 1100, and associated member cards 1102, . . . , 1104. This group can, typically, be related to a particular application. For example, such an application might be an electronic program guide, where the cards comprise a set of guides for twelve weeks of TV programs. All members of this group of cards share a common group identification number (GIN), which is stored in on-board memory in each card. One of the members of the group is designated as the base card, in the present case the card 1100. The base card 1100 has a member identification number (MIN) of zero. This base card 1100 has a relatively large amount of memory, typically of the order of 4K bytes. The associated member cards 1102, . . . , 1104 have card-specific MINs that are not zero. The base card 1100 contains interface descriptions for all member cards 1102, . . . , 1104 of the group, as well as an interface description for the base card itself. The member card interface descriptions are indexed by the corresponding MINs.

Figure 12:
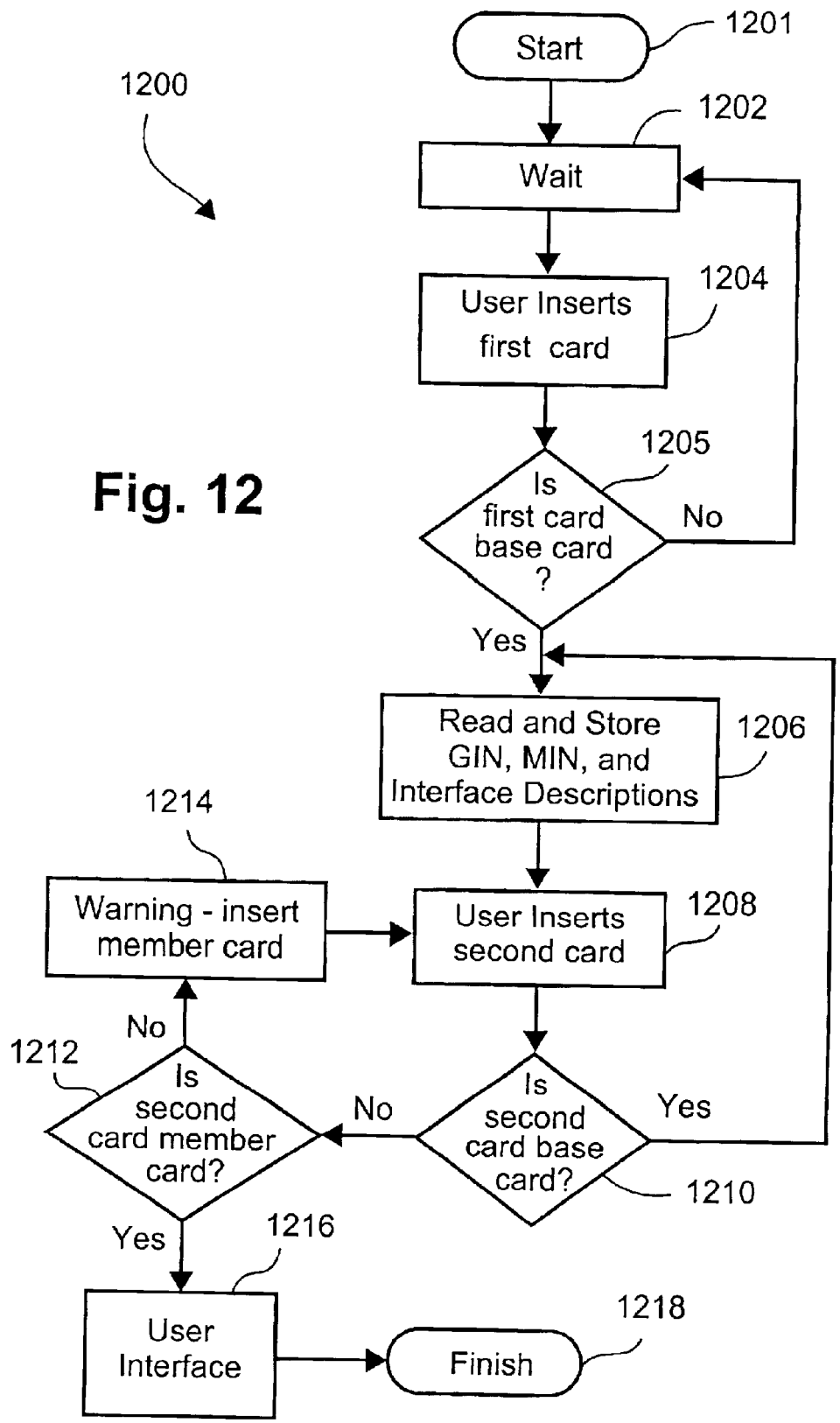
FIG. 12 shows a flowchart of a method of using multiple smartcards in accordance with the further embodiment.

Turning now to FIG. 12, there is shown a flowchart of a method of using multiple smartcards in accordance with the further embodiment. The method 1200 commences at step 1201, where any currently stored data obtained from any previously inserted base cards is deleted. The method then waits 1202 for the insertion of a base card by a user. When a "first" card is inserted 1204 into the reader, the reader first checks 1203 whether the inserted "first" card is a base card. Specifically, the smartcard reader reads the inserted card and determines whether its value MIN is equal to zero. In the event the inserted card is not a base card the method issues 1205 a warning and returns to the waiting step 1202 for the insertion of a new "first" card. In the event the inserted card is a base card, then the reader 1114 reads from the memory storage of the base card the icon/action descriptions (ie the interface descriptions 136) for all the member cards in the group and stores 1206 them in memory 1132. The reader 1114 also stores 1206 the GIN value of the base card in the memory 1132. The user may the commence user interaction with the base card if desired.

When the base card 1100 is ejected from the reader 1114 and a "second" card is inserted 1208 in its place, the method checks 1210 whether the newly inserted "second" card is a base card. If another base card has been inserted, this will be indicated by a different GIN and an MIN of zero. In this event, the reader 1114 and associated processor 1128 recognise that a new base card has been inserted, and the historic data associated with the previous base card 1100 is then deleted, the method now focusing on the new base card and returning to step 1206 for storing information as was described for the previous base card 1100.

In the event the newly inserted card is not a base card, the method 1200 checks 1212 whether the newly inserted card is a member card. If, instead of a new base card, a member card from the same group (eg. the member card 1102) is inserted 1208, the member card will have the same GIN, but a non-zero MIN. If this is indeed the case, the inserted member card 1102 can then be used 1216 as a normal user interface. In the latter case, the MIN of the inserted "second" card is then used by the method to index into the interface description data 1136 that has been stored in the memory 1132. When the user selects an icon by pressing the pressure sensitive membrane over the icon of the inserted card, the smartcard reader determines the x,y coordinates of the area of the pressure sensitive membrane that was pressed by the user and passes this information onto the processing device. The processing device then reads the list and matches the MIN value and the x,y coordinates of the list with the MIN value of the inserted card and x,y coordinates of the pressed area and performs the one or more commands associated with the matched x,y coordinates and MIN values.

If a member card of a different group is inserted 1208, the method will detect a different GIN to that presently in memory, and a non-zero MIN. The method thereby recognises that this an inappropriate card, and issues a warning 1314 such as an audible beep and returns to step 1208 waiting for the insertion of a new "second" card. The user, in this case, either inserts an appropriate base card, or a member card associated with the last inserted base card.

The method terminates 1218, after the user completes the user interaction 1216.

It is seen that member cards of a card group need only store two items of information, namely the group GIN and a personal MIN. These data can be stored in a relatively small amount of memory, typically 32 bits for the GIN, and 16 bits for the MIN, which is a total of only 48 bits. These member cards are, accordingly, significantly cheaper than a standard 4K bit card, which is now required only to support requirements of the single base card. As explained in the description however, a base card must be inserted before any associated member cards of a group can be used.

A variation of the further embodiment, not directly involving provision of programmable user interfaces, comprises groups of electronically readable cards for accessing Automatic Teller Machines (ATMs), each such group usable by a family. This could be of particular interest to a family with young children who would appreciate and learn from the experience of having an operative ATM card while leaving an associated access code in the hands of their parents. In this embodiment, the parent inserts a base ATM card which identifies, to the ATM, the name of the relevant account. Thereafter, the parent enters the required Personal Identity Number (PIN) to provide access to the account. Subsequently, after the parent withdraws the base card from the ATM, each child having an associated member ATM card can insert their member card into the ATM, and withdraw funds. The ATM reads the relevant account name from the ATM card for each child, but does not need the PIN, which has already been entered by the parent using the base card. After the children have made their withdrawals for the day, the parent cancels the access by pressing an appropriate key on the ATM, and now the children's cards are no longer operative.

The method in accordance with the preferred embodiment or the further preferred embodiment is preferably practiced using a set top box, such as a VCR, DVD player or other domestic, service or industrial appliance. The set top box preferably comprises a microprocessor and associated memory for running the session manager and application(s). The set top box preferably has an input/output device interfacing the microprocessor and a transceiver so as to communicate with the smartcard reader. The microprocessor is also coupled to other functional units of the set top box for controlling the operation of these functional units.

Figure 13:
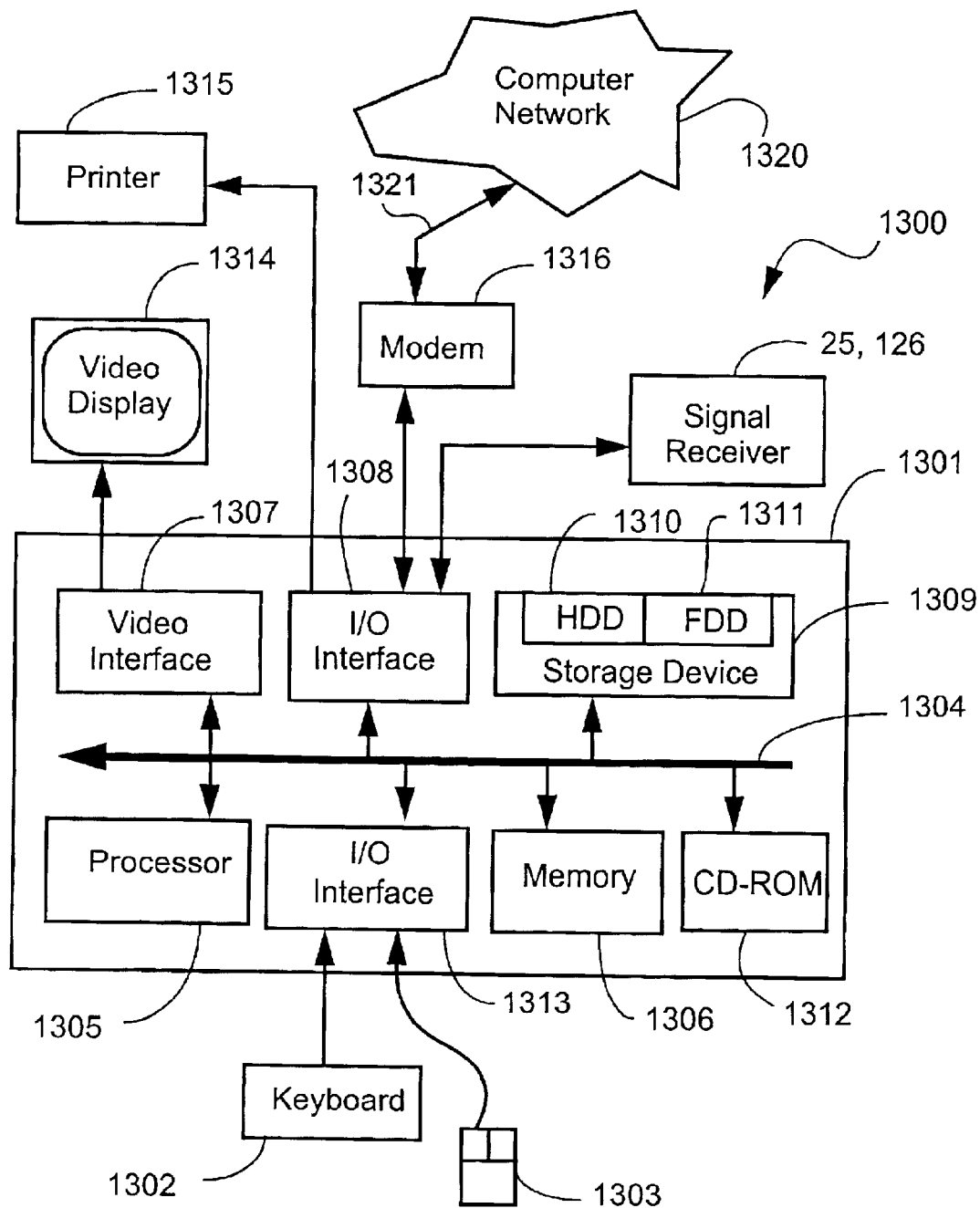
FIG. 13 shows a block diagram of a general-purpose computer suitable for implementing the preferred methods of FIGS. 8, 9, 10A and 10B or FIG. 12.

Alternatively, the method in accordance with preferred embodiment or the further preferred embodiment is be practiced on a general-purpose computer system 1300, such as that shown in FIG. 13 wherein the preferred methods are implemented as software executing within the computer system 1300. In particular, the preferred methods are effected by instructions in the software that are carried out by the computer. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for using multiple smartcards.

The computer system 1300 comprises a computer module 1301, input devices such as a keyboard 1302 and mouse 1303, and output devices including a printer 1315 and a display device 1314. A Modulator-Demodulator (Modem) transceiver device 1316 is used by the computer module 1301 for communicating to and from a communications network 1320, for example connectable via a telephone line 1321 or other functional medium. The modem 1316 can be used to obtain access to the Internet, and other network systems, such as a Local Area Network (LAN) or a Wide Area Network (WAN). A signal receiver, such as 25, is used by the computer module 1301 for communicating to and from a smartcard reader 8 (not shown). Alternatively, a hardwire connection, such as 126, can be used for communicating with the smartcard reader.

The computer module 1301 typically includes at least one processor unit 1305, a memory unit 1306, for example formed from semiconductor random access memory (RAM) and read only memory (ROM), input/output (I/O) interfaces including a video interface 1307, and an I/O interface 1313 for the keyboard 1302 and mouse 1303 and optionally a joystick (not illustrated), and an interface 1308 for the modem 1316. A storage device 1309 is provided and typically includes a hard disk drive 1310 and a floppy disk drive 1311. A magnetic tape drive (not illustrated) may also be used. A CD-ROM drive 1312 is typically provided as a non-volatile source of data. The components 1305 to 1313 of the computer module 1301, typically communicate via an interconnected bus 1304 and in a manner, which results in a conventional mode of operation of the computer system 1300 known to those in the relevant art. Examples of computers on which the described arrangements can be practised include IBM-PC's and compatibles, Sun Sparcstations or alike computer systems evolved therefrom.

Typically, the software implementing the preferred methods are resident on the hard disk drive 1310 and read and controlled in its execution by the processor 1305. Intermediate storage of the programs and any data fetched from the network 1320 may be accomplished using the semiconductor memory 1306, possibly in concert with the hard disk drive 1310. In some instances, the program may be supplied to the user encoded on a CD-ROM or floppy disk and read via the corresponding drive 1312 or 1311, or alternatively may be read by the user from the network 1320 via the modem device 1316. Still further, the software can also be loaded into the computer system 1300 from other computer readable medium including magnetic tape, a ROM or integrated circuit, a magneto-optical disk, a radio or infra-red transmission channel between the computer module 1301 and another device, a computer readable card such as a PCMCIA card, and the Internet and Intranets including email transmissions and information recorded on websites and the like. The foregoing is merely exemplary of relevant computer readable mediums. Other computer readable media may alternately be used.

Industrial Applicability

It is apparent from the above that the arrangements described are applicable to the use of smartcards and their related industries.

The foregoing describes only some embodiments of the present invention, and modifications and/or changes can be made thereto without departing from the scope and spirit of the invention, the embodiment(s) being illustrative and not restrictive. For example, the aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequential.

What is claimed is:

1. A method of using at least two cards with a single reader which has a touch-sensitive transparent membrane, the method comprising the steps of:

initiating a session of an application when a first of the cards associated with the application is inserted into the reader;

maintaining the session active when the first card is removed from the reader and a second of the cards is to be inserted into the reader, wherein the second card comprises printed indicia thereon, each indicium corresponding with an associated action, and a memory having stored therein data associated with the indicia and the associated actions;

transmitting data associated with an action corresponding to a selection of one of the indicia by a touch applied to the transparent membrane over the one of the indicia of the second card; and performing the associated action corresponding to the transmitted data.

2. A method as claimed in claim 1, wherein said step of initiating a session further comprises the steps of loading and executing the application.

3. A method as claimed in claim 1, wherein said step of initiating a session further comprises the step of starting an instance of the application.

4. A method as claimed in claim 1, wherein said performing step further comprises the step of:

transmitting, upon insertion of the second card into the reader, data read from the second card to the application.

5. A method as claimed in claim 4, wherein said performing step further comprises the step of:

transmitting, upon insertion of another one of the cards into the reader, data read from the other card to the application.

6. A method as claimed in claim 4, wherein the data is an address to a computer program.

7. A method as claimed in claim 6, further comprising the step of:

executing the computer program.

8. A method as claimed in claim 4, wherein the data is for information purposes of the application.

9. A method as claimed in claim 1, wherein said maintaining step further comprises the steps of:

transmitting a message from the application to a controlling program indicating that the second card is required to be inserted in the reader; and waiting for insertion of the second card in the reader.

10. A method as claimed in claim 1, wherein said maintaining step further comprises the step of:

terminating the session after a predetermined time if the second card has not been inserted in the reader.

11. A method as claimed in claim 1, wherein the performing step further comprises the steps of:

receiving a message from the reader that a card has been inserted;

determining whether the inserted card is the second card; and transmitting, upon determination that the inserted card is the second card, data read from the second card to the application.

12. A method as claimed in claim 11, wherein each of the cards has an identifier uniquely identifying the application and said determining step determines the inserted card by the unique identifier.

13. A method as claimed in claim 1, wherein upon completion of said performing step, a controlling program returns from a current mode to a first mode.

14. A method as claimed in claim 1, wherein said maintaining step further comprises the step of:

terminating the session, when a message has been received that the first card has been removed from the reader and no message has been received from the session indicating that the second card is able to be inserted in the reader.

15. A method as claimed in claim 1, wherein the method comprises the steps of:

initiating another session corresponding to a newly-inserted other card associated with another application, when no message has been received from the application associated with the first card indicating the newly-inserted other card is able to be inserted in the reader.

16. A method as claimed in claim 1, wherein each of the cards has an identifier uniquely identifying the application.

17. A method as claimed in claim 1, wherein said initiating step further comprises the step of:
automatically starting the session of the application when the first card associated with the application is inserted into the reader and a controlling program operating on a processing device is in a first mode.

18. A method as claimed in claim 1, wherein said initiating step further comprises the steps of:
starting the session of the application when the first card is inserted in the reader and a user selects an indicium on the first card and a controlling program operating on a processing device communicating with the reader is in a first mode.

19. A method as claimed in claim 1, wherein said initiating step further comprises the steps of:
reading an address of the application from the first card; and
loading and executing the application using the address.

20. A method as claimed in claim 1, wherein one of the second cards comprises personal information data of a user and said performing step further comprises transferring the personal information data to the application.

21. A method as claimed in claim 1, wherein the application is a computer program game and the first card comprises an address of the computer program game and the second card comprises data for use in that game.

22. A method as claimed in claim 1, wherein the application is a computer program game and the first card comprises an address of the computer program game and the second card comprises an address of a subsidiary computer program for use with the computer program game.

23. A method as claimed in claim 1, wherein the second card comprises business information data of a user and said performing step further comprises transferring the business information data to the application.

24. A method as claimed in claim 1, wherein the card operates as the first card in one context and operates as the second card in another context.

25. A method as claimed in claim 1, wherein the application is a card duplicating application and said performing step further comprises duplicating information from the second card acting as a source to another of the cards acting as a target.

26. A method as claimed in claim 1, wherein the application supports browsing of content and purchase and/or retrieval of all or parts of the content, and said performing step further comprises storing the purchased and/or retrieved content on the second card.

27. A method as claimed in claim 1, wherein the first card comprises a memory chip and the second card comprises a magnetic strip.

28. A method as claimed in claim 1, wherein the first card comprises a memory chip and the second card is a credit card.

29. A method as claimed in claim 1, wherein the memory of each of the cards has stored therein locational data associated with the indicia and corresponding commands for performing the associated actions, the method comprising the further steps of:
transmitting the locational data and corresponding commands to a processing device upon insertion of the card into the reader;
transmitting locational data associated with a selection of an indicium by a user pressing the transparent membrane over the indicium; and
performing the associated action corresponding to the transmitted locational data.

30. A method as claimed in claim 29, wherein one of the cards is the second card and one of the associated actions is the action.

31. A system for using at least two cards, wherein the system comprises:
said at least two cards;
a single card reader comprising a touch sensitive transparent membrane;
a processing device having a controlling program operating therein;
a communication device for communicating between the single card reader and, the processing device to thereby transmit data associated with an action resulting from a selection of one of the indicia by a user touching the transparent membrane over the indicia of the card; and
wherein said controlling program comprises:
means for initiating a session of an application when a first of the cards associated with the application is inserted into said reader;
means for maintaining the session active when the first card is removed from said reader and a second of the cards is to be inserted into said reader, wherein the second card comprises printed indicia thereon, each indicium corresponding with an associated action, and a memory having stored therein data associated with the indicia and the associated actions; and
means for performing the associated action corresponding to the transmitted data when the second card is inserted into said reader.

32. A system as claimed in claim 31, wherein said means for initiating a session further comprises means for loading and executing the application.

33. A system as claimed in claim 31, wherein said means for initiating a session further comprises means for starting an instance of the application.

34. A system as claimed in claim 31, wherein said performing means further comprises:
means for transmitting, upon insertion of the second card into said reader, data read from the second card to the application.

35. A system as claimed in claim 34, wherein said performing means further comprises:
means for transmitting, upon insertion of another card into said reader, data read from the other card to the application.

36. A system as claimed in claim 34, wherein the data is an address to a computer program.

37. A system as claimed in claim 36, wherein said system further comprises:
means for executing the computer program.

38. A system as claimed in claim 34, wherein the data is for information purposes of the application.

39. A system as claimed in claim 31, wherein said maintaining means further comprises:
means for transmitting a message from the application to the controlling program indicating that the second card is required to be inserted in said reader; and
means for waiting for the insertion of the second card in the reader.

40. A system as claimed in claim 31, wherein said maintaining means further comprises:

means for terminating the session after a predetermined time if the second card has not been inserted in said reader.

41. A system as claimed in claim 31, wherein the performing means further comprises:
means for receiving a message from the card reader that a card has been inserted;
means for determining whether the inserted card is the second card; and
means for transmitting, upon determination that the inserted card is the second card, data read from the second card to the application.

42. A system as claimed in claim 41, wherein each of the cards has an identifier uniquely identifying the application and said determining means determines the inserted card by the unique identifier.

43. A system as claimed in claim 31, wherein upon completion of the action, the controlling program returns from a current mode to a first mode.

44. A system as claimed in claim 31, wherein said terminating means further comprises:
means for terminating the session, when a message has been received that the first card has been removed from said reader and no message has been received from the session indicating the second card is able to be inserted in said reader.

45. A system as claimed in claim 31, wherein the system comprises:
means for initiating another session corresponding to a newly-inserted other card associated with another application, when no message has been received from the application associated with the first card indicating the newly-inserted other card is able to be inserted in the card reader.

46. A system as claimed in claim 31, wherein each of the cards has an identifier uniquely identifying an application.

47. A system as claimed in claim 31, wherein said initiating means further comprises:
means for automatically starting the session of the application when the first card associated with the application is inserted into said reader and the controlling program operating on the processing device is in a first mode.

48. A system as claimed in claim 31, wherein said initiating means further comprises:
means for starting the session of the application when the first card is inserted in the reader and a user activates the indicium on the first card and the controlling program operating on the processing device is in a first mode.

49. A system as claimed in claim 31, wherein said initiating means further comprises:
means for reading an address of the application from the first card; and
means for loading and executing the application using the address.

50. A system as claimed in claim 31, wherein one of the cards comprises personal information data of a user and said performing means further comprises means for transferring the personal information data to the application.

51. A system as claimed in claim 31, wherein the application is a computer program game and the first card comprises an address of the computer program game and the second card comprises data for use in the game.

52. A system as claimed in claim 31, wherein the application is a computer program game and the first card comprises an address of the computer program game and the second card comprises an address of a subsidiary computer program for use with the computer program game.

53. A system as claimed in claim 31, wherein the second card comprises business information data of a user and said performing means further comprises means for transferring the business information data to the application.

54. A system as claimed in claim 31, wherein a card operates as the first card in one context and operates as the second card in another context.

55. A system as claimed in claim 31, wherein the application is a card duplicating application and said performing means further comprises means for duplicating information from the second card acting as a source to another card acting as a target.

56. A system as claimed in claim 31, wherein the application supports browsing of content and purchase and/or retrieval of all or parts of the content and said performing means further comprises means for storing the purchased and/or retrieved content on the second card.

57. A system as claimed in claim 31, wherein the first card comprises a memory chip and the second card comprises a magnetic strip.

58. A system as claimed in claim 31, wherein the first card comprises a memory chip and the second card is a credit card.

59. A system as claimed in claim 31, wherein the memory is a chip having stored therein locational data associated with the indicia and corresponding commands for performing the associated actions, and wherein the communication device transmits the locational data and corresponding commands to the processing device upon insertion of one of the cards into said reader and said communication device transmits locational data associated with a selection of an indicia by a user touching the transparent membrane over the indicia, the processing device performing the associated action corresponding to the transmitted locational data.

60. A system as claimed in claim 59, wherein one of the cards is the second card and one of the associated actions is the action.

61. A computer readable medium comprising a computer program for interfacing between an application and a single card reader, wherein the computer program comprises:
means for initiating a session of an application when a first card associated with the application is inserted into the reader;
means for maintaining the session active when the first card is removed from the reader and a second card associated with the first card is to be inserted in the reader, wherein the first and second cards each have (a) printed indicia thereon, each indicium corresponding with an associated action, and (b) a memory storing data associated with the indicia and the associated actions, and wherein the reader has a touch sensitive membrane through which the indicia on an inserted card is visible and is selectable by a touch on the membrane; and
means for performing an action when the second card is inserted in the reader, wherein the action results from at least one of insertion of the second card into the reader and selection of one of the indicia on the second card.

62. A method of interfacing between an application and a single card reader, wherein the method comprises:
initiating a session of an application when a first card associated with the application is inserted into the reader and a controlling program operating on a processing device is in a first mode;

terminating the session of the application when the first card is removed from the reader and the controlling program operating on the processing device is in the first mode;

changing the operation of the controlling program from the first mode to a second mode in response to a message from the session of the application that at least one second card associated with the application is able to be inserted in the reader;

waiting for the second card associated with the application to be inserted in the reader when the first card is removed from the reader and the controlling program is in a second mode; and passing data from the second card to the application when the second card is inserted in the reader and the controlling program is in a second mode, wherein the first and second cards each have (a) printed indicia thereon, each indicium corresponding with an associated action, and (b) a memory storing data associated with the indicia and the associated actions, and wherein the reader has a touch sensitive membrane through which the indicia on an inserted card is visible and is selectable by a touch on the membrane, wherein the data is passed dependent upon at least one of insertion of the second card into the reader and selection of one of the indicia on the second card.

63. A method as claimed in claim 62, wherein the passing data step further comprises the steps of:

receiving a message from the card reader that a card has been inserted;

determining whether the inserted card is the second card; and transmitting, upon determination that the inserted card is the second card, data read from the second card to the application.

64. An Apparatus for interfacing between an application and a single card reader, the apparatus comprising:

means for initiating a session of an application when a first card associated with the application is inserted into the reader and a controlling program operating on a processing device is in a first mode;

means for terminating the session of the application when the first card is removed from the reader and the controlling program operating on the processing device is in the first mode;

means for changing the operation of the controlling program from the first mode to a second mode in response to a message from the session of the application that at least one second card associated with the application is able to be inserted in the reader;

means for waiting for the second card associated with the application to be inserted in the reader when the first card is removed from the reader and the controlling program is in a second mode; and means for passing data from the second card to the application when the second card is inserted in the reader and the controlling program is in a second mode, wherein the first and second cards each have (a) printed indicia thereon, each indicium corresponding with an associated action, and (b) a memory storing data associated with the indicia and the associated action, and wherein the reader has a touch sensitive membrane through which the indicia on an inserted card is visible and is selectable by a touch on the membrane, wherein the data is passed dependent upon at least one of insertion of the second card into the reader and selection of one of the indicia on the second card.

65. A computer readable medium comprising a computer program for interfacing between an application and a single card reader, said computer program comprising:

means for initiating a session of an application when a first card associated with the application is inserted into the reader and a controlling program operating on a processing device is in a first mode;

means for terminating the session of the application when the first card is removed from the reader and the controlling program operating on the processing device is in the first mode;

means for changing the operation of the controlling program from the first mode to a second mode in response to a message from the session of the application that at least one second card associated with the application is able to be inserted in the reader;

means for waiting for the second card associated with the application to be inserted in the reader when the first card is removed from the reader and the controlling program is in a second mode; and means for passing data from the second card to the application when the second card is inserted in the reader and the controlling program is in a second mode, wherein the first and second cards each have (a) printed indicia thereon, each indicium corresponding with an associated action, and (b) a memory storing data associated with the indicia and the associated actions, and wherein the reader has a touch sensitive membrane through which the indicia on an inserted card is visible and is selectable by a touch on the membrane, wherein the data is passed dependent upon at least one of insertion of the second card into the reader and selection of one of the indicia on the second card.

66. A method of using multiple cards in a system comprising a processing device and a single card reader communicating therewith, the method comprising:

initiating a session of an application when a first card associated with the application is inserted into the reader and a controlling program operating on the processing device is in a first mode;

terminating the session of the application when the first card is removed from the reader and the controlling program operating on the processing device is in the first mode;

changing the operation of the controlling program from the first mode to a second mode in response to a message from the session of the application that at least one second card associated with the application is able to be inserted in the reader;

waiting for the second card associated with the application to be inserted in the reader when the first card is removed from the reader and the controlling program is in a second mode; and performing an action when the second card is inserted in the reader and the controlling program is in a second mode, wherein the first and second cards each have (a) printed indicia thereon, each indicium corresponding with an associated action, and (b) a memory storing data associated with the indicia and the associated actions, and wherein the reader has a touch sensitive membrane through which the indicia on an inserted card is visible and is selectable by a touch on the membrane, wherein the action is performed dependent upon at least one of insertion of the second card into the reader and selection of one of the indicia on the second card.

67. A system for using multiple cards, wherein the system comprises:
a single card reader;
a processing device having a controlling program operating therein;
communication means for communicating between said single card reader and said processing device, wherein said processing device comprises:
means for initiating a session of an application when a first card associated with the application is inserted into the reader and the controlling program operating on said processing device is in a first mode;
means for terminating the session of the application when the first card is removed from the reader and the controlling program operating on said processing device is in the first mode;
means for changing the operation of the controlling program from the first mode to a second mode in response to a message from the session of the application that at least one second card associated with the application is able to be inserted in the reader;
means for waiting for the second card associated with the application to be inserted in the reader when the first card is removed from the reader and the controlling program is in a second mode; and
means for performing an action when the second card is inserted in the reader and the controlling program is in a second mode, wherein the first and second cards each have (a) printed indicia thereon, each indicium corresponding with an associated action, and (b) a memory storing data associated with the indicia and the associated actions, and wherein the reader has a touch sensitive membrane through which the indicia on an inserted card is visible and is selectable by a touch on the membrane, wherein the action is performed dependent upon at least one of insertion of the second card into the reader and selection of one of the indicia on the second card.

68. A method of using multiple cards, aggregated into a lesser plurality of groups of the cards, said method comprising the steps of:
(a) inserting a first card into a card reader;
(b) reading and storing, if the first card is a base card (i) an identity for a group, (ii) an identity of the base card, (iii) an interface description for the base card, (iv) an identity for at least one associated member card, and (v) an interface description for at least one associated member card;
(c) ejecting the first card from the card reader and inserting a second card therein, the card reader making accessible a user selectable icon, having an associated action, on a surface of the inserted second card;
(d) reading, if the second inserted card is a member card associated with the base card: (i) the identity of the group, to which the second inserted card is associated, and (ii) an identity of the inserted associated member card;
(e) comparing the group identity read from the first card to the group identity read from the second card; and
(f) enabling, because the compared group identities match, the associated action if a user selects the user selectable icon, whereby the association between the icon and the action is defined by the interface description for the associated member card read and stored from the associated base card.

69. A method according to claim 68, whereby if in step (c) the second inserted card is a member card associate with another base card, the method comprises, after step (c), the steps of:
(g) reading by the card reader (i) an identity of a group to which the second inserted card is associated, and (ii) an identity of the inserted member card;
(h) comparing the group identity read from the first card to the group identity read from the second card; and
(i) not enabling, because the compared group identities do not match, the associated action if a user selects the user selectable icon.

70. A method according to claim 69, further comprising the step of:
(j) emitting an alarm to the user, indicating that insertion of an incompatible member card has occurred.

71. A method according to claim 68, whereby if in step (c) the second inserted card is another base card, the method reverts to step (b), regarding the second inserted card as being the first inserted card, as previously defined in step (a).

72. A method as claimed in claim 68, wherein one or more of the cards each comprise printed indicia thereon, each indicium corresponding with an associated action, and a memory chip having stored therein locational data associated with the indicia and corresponding commands for performing the associated actions, the reader comprising a pressure sensitive membrane, and the method comprising the steps of:
transmitting the locational data and corresponding commands to the processing device upon insertion of the card into the reader;
transmitting locational data associated with a selection of an indicia by a user pressing the transparent membrane over the indicia; and
performing the associated action corresponding to the transmitted locational data.

73. A method as claimed in claim 72, wherein one of the one or more cards is the second card and one of the associated actions is the action.

74. A method for enabling card initiated actions associated with a group of cards comprising a base card and at least one associated member card, said method comprising steps of:
inserting the base card into a card reader;
reading of base card data and first data for the associated member card from the inserted base card;
inserting the member card into the card reader;
reading of second data from the inserted member card; and
enabling a card initiated action associated with the member card dependent upon a correspondence between the first data and the second data, wherein the base and member cards each have (a) printed indicia thereon, each indicium corresponding with an associated action, and (b) a memory storing data associated with the indicia and the associated actions, and wherein the reader has a touch sensitive membrane through which the indicia on an inserted card is visible and is selectable by a touch on the membrane, wherein the enabled action can be performed dependent upon at least one of insertion of the second card into the reader and selection of one of the indicia on the second card.

75. An Apparatus for using multiple cards, aggregated into a lesser plurality of groups of the cards, said apparatus comprising:

means for reading and storing from a first card, if the first card is a base card: (i) an identity for a group, (ii) an identity of the base card, (iii) an interface description for the base card, (iv) an identity for at least one associated member card, and (v) an interface description for the at least one associated member card;

means for reading from a second card, if the second card is a member card associated with the base card: (i) the identity of the group, to which the second inserted card is associated, and (ii) an identity of the inserted associated member card;

means for comparing the group identity read from the first card to the group identity read from the second card; and means for enabling an action associated with a user selectable icon, if the compared group identities match, and if a user selects the user selectable icon, whereby the association between the icon and the action is defined by the interface description for the associated member card read and stored from the associated base card.

76. An Apparatus for enabling card initiated actions associated with a group of cards comprising a base card and at least one associated member card, said apparatus comprising:

means for reading base card data and first data for the at least one associated member card from a base card inserted in a card reader;

means for reading second data from a member card inserted in a card reader; and enabling a card initiated action associated with the member card dependent upon a correspondence between the first data and the second data, wherein the base and member cards each have (a) printed indicia thereon, each indicium corresponding with an associated action, and (b) a memory storing data associated with the indicia and the associated actions, and wherein the reader has a touch sensitive membrane through which the indicia on an inserted card is visible and is selectable by a touch on the membrane, wherein the enabled action can be performed dependent upon at least one of insertion of the second card into the reader and selection of one of the indicia on the second card.

77. A computer readable medium comprising a computer program for interfacing between multiple cards, aggregated into a lesser plurality of groups of the cards, said computer program comprising:

means for reading and storing from a first card, if the first card is a base card: (i) an identity for a group, (ii) an identity of the base card, (iii) an interface description for the base card, (iv) an identity for at least one associated member card, and (v) an interface description for the at least one associated member card;

means for reading from a second card, if the second card is a member card associated with the base card: (i) the identity of the group, to which the second inserted card is associated, and (ii) an identity of the inserted associated member card;

means for comparing the group identity read from the first card to the group identity read from the second card; and means for enabling an action associated with a user selectable icon, if the compared group identities match, and if a user selects the user selectable icon, whereby the association between the icon and the action is defined by the interface description for the associated member card read and stored from the associated base card.

78. A computer readable medium comprising a computer program for interfacing between multiple cards, aggregated into a lesser plurality of groups of the cards, said computer program comprising:

means for reading of base card data and first data for the at least one associated member card from a base card inserted in a card reader;

means for reading of second data from a member card inserted in a card reader; and enabling a card initiated action associated with the member card dependent upon a correspondence between the first data and the second data, wherein the first and second cards each have (a) printed indicia thereon, each indicium corresponding with an associated action, and (b) a memory storing data associated with the indicia and the associated actions, and wherein the reader has a touch sensitive membrane through which the indicia on an inserted card is visible and is selectable by a touch on the membrane, wherein the enabled action can be performed dependent upon at least one of insertion of the second card into the reader and selection of one of the indicia on the second card.

79. A base card of one or more associated member cards, wherein the base card and the one or more member cards form a group of cards, each of the base and member cards comprising memory storage having stored therein a common group number identifying the group and a number identifying the card, and each member card comprising an interface for user interaction, wherein the memory storage of the base card having further stored therein interface descriptions of each member card.

80. A member card associated with a base card, wherein the base card and the member card form a group of cards, each of the base and member cards comprising memory storage having stored therein a common group number identifying the group and a number identifying the card, and each member card comprising an interface for user interaction, wherein the memory storage of the base card having further stored therein interface descriptions of the member card.

* * * * *

UNITED STATES PATENT AND TRADEMARK OFFICE
CERTIFICATE OF CORRECTION

PATENT NO. : 6,824,045 B2
DATED : November 30, 2004
INVENTOR(S) : Sue-Ken Yap et al.

It is certified that error appears in the above-identified patent and that said Letters Patent is hereby corrected as shown below:

<u>Title page,</u>
Item [56], References Cited, FOREIGN PATENT DOCUMENTS,
"197576648" should read -- 19757648 --; "JP 03-071329 6/2000" should read
-- JP 3071329 6/2000 --; "9607267" should read -- 96/07267 --; "9608798"
should read -- 96/08798 --; and "9722092" should read -- 97/22092 --.

<u>Column 4,</u>
Line 67, "form" should read -- from --.

<u>Column 5,</u>
Line 36, "form" should read -- from --.

<u>Column 11,</u>
Line 8, "(eg" should read -- (e.g. --;
Line 10, "( eg" should read -- (e.g. --; and
Line 58, "an" should read -- a --.

<u>Column 13,</u>
Lines 33, 47, 55, 64 and 67, "goto" should read -- go to --.

<u>Column 15,</u>
Line 8, "(viz" should read -- (viz. --; and
Lines 58 and 62, "(eg" should read -- (e.g. --.

<u>Column 16,</u>
Line 53, "(ie" should read -- (i.e. --; and
Line 67, "(eg" should read -- (e.g. --.

<u>Column 17,</u>
Lines 2 and 4, "(eg" should read -- (e.g. --.

<u>Column 18,</u>
Line 18, "In" should read -- In a --; and
Line 19, "cardduplicating" should read -- card-duplicating --.

<u>Column 21,</u>
Line 8, "(ie" should read -- (i.e. --.

<u>Column 28,</u>
Line 34, "indicia" should read -- indicium --.

UNITED STATES PATENT AND TRADEMARK OFFICE
CERTIFICATE OF CORRECTION

PATENT NO. : 6,824,045 B2
DATED : November 30, 2004
INVENTOR(S) : Sue-Ken Yap et al.

It is certified that error appears in the above-identified patent and that said Letters Patent is hereby corrected as shown below:

Column 29,
Line 37, "Apparatus" should read -- apparatus --.

Column 30,
Line 66, "is" (both occurrences) should read -- are --.

Column 31,
Line 15, "a" should read -- the --; and
Line 38, "is" (both occurrences) should read -- are --.

Column 32,
Line 5, "associate" should read -- associated --;
Line 37, "indicia" should read -- indicium --; and
Line 63, "is" (both occurrences) should read -- are --.

Column 33,
Lines 1 and 26, "Apparatus" should read -- apparatus --; and
Line 43, "is" (both occurrences) should read -- are --.

Column 34,
Line 33, "is" (both occurrences) should read -- are --.

Signed and Sealed this

Twenty-third Day of August, 2005

JON W. DUDAS
*Director of the United States Patent and Trademark Office*